United States Patent
Arai

(10) Patent No.: US 6,912,246 B1
(45) Date of Patent: Jun. 28, 2005

(54) CLOCK SIGNAL TRANSMITTING SYSTEM, DIGITAL SIGNAL TRANSMITTING SYSTEM, CLOCK SIGNAL TRANSMITTING METHOD, AND DIGITAL SIGNAL TRANSMITTING METHOD

(75) Inventor: Masahiro Arai, Tokyo (JP)

(73) Assignee: NEC Corporation, Tokyo (JP)

( * ) Notice: Subject to any disclaimer, the term of this patent is extended or adjusted under 35 U.S.C. 154(b) by 988 days.

(21) Appl. No.: 09/712,921

(22) Filed: Nov. 16, 2000

(30) Foreign Application Priority Data

Nov. 17, 1999 (JP) .......................................... 11-327198

(51) Int. Cl.[7] ............................................... H04B 1/38
(52) U.S. Cl. ..................................... 375/219; 375/257
(58) Field of Search ................................ 375/219, 220, 375/257, 258, 259, 377, 354, 356, 362, 364; 327/1, 50, 58, 60, 63, 68, 72, 90

(56) References Cited

U.S. PATENT DOCUMENTS 5,736,893 A     4/1998  Puckette et al.
5,864,253 A  *  1/1999  Katakura et al. ............ 327/297
6,297,816 B1 * 10/2001  Nishitani et al. ............ 345/213
6,477,205 B1 * 11/2002  Doblar et al. ................ 375/259

FOREIGN PATENT DOCUMENTS

| JP | 61-24321      | 2/1986 |
| JP | 11-110067 A   | 4/1999 |
| JP | 11-168513 A   | 6/1999 |
| WO | WO 99/38281 A2| 7/1999 |

* cited by examiner

*Primary Examiner*—Don N. Vo
(74) *Attorney, Agent, or Firm*—Sughrue Mion, PLLC

(57) ABSTRACT

A clock signal transmitting system is disclosed, which comprises a controlling circuit for generating a first control signal and a second control signal which contains synchronization information of the first control signal, a first reference voltage generating circuit for generating a first reference voltage which periodically varies corresponding to the first control signal, a second reference voltage generating circuit for generating a second reference voltage which periodically varies corresponding to the second control signal, a first comparator for comparing a source clock signal with the first reference voltage and generating a transmission clock signal, and a second comparator for comparing the transmission clock signal with the second reference voltage and generating a reproduced clock signal.

38 Claims, 24 Drawing Sheets

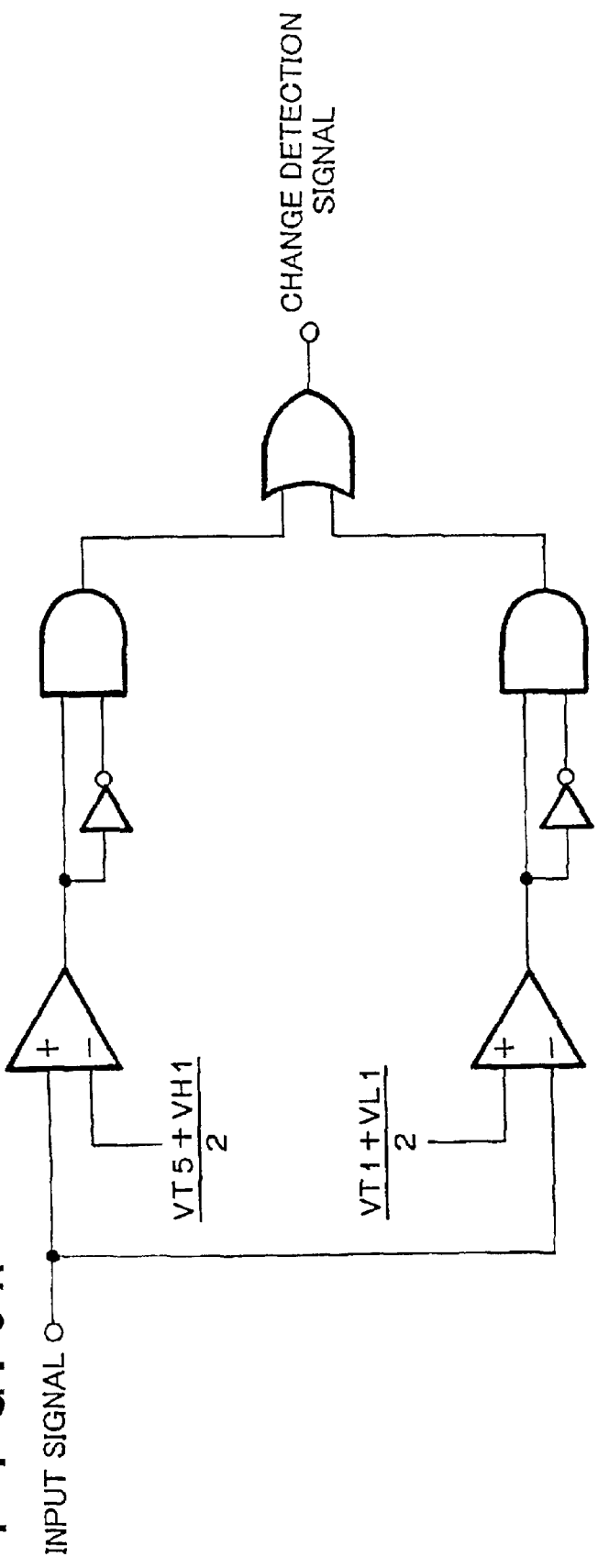
F I G. 9A
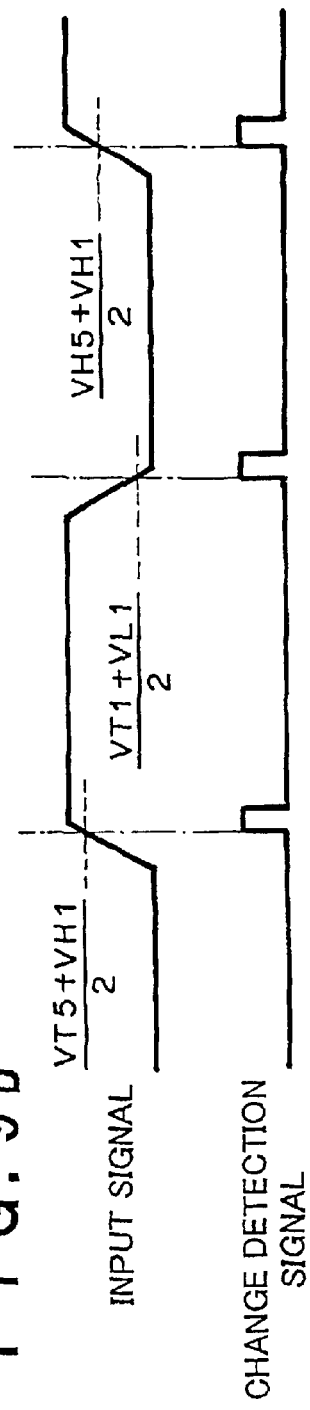
F I G. 9B

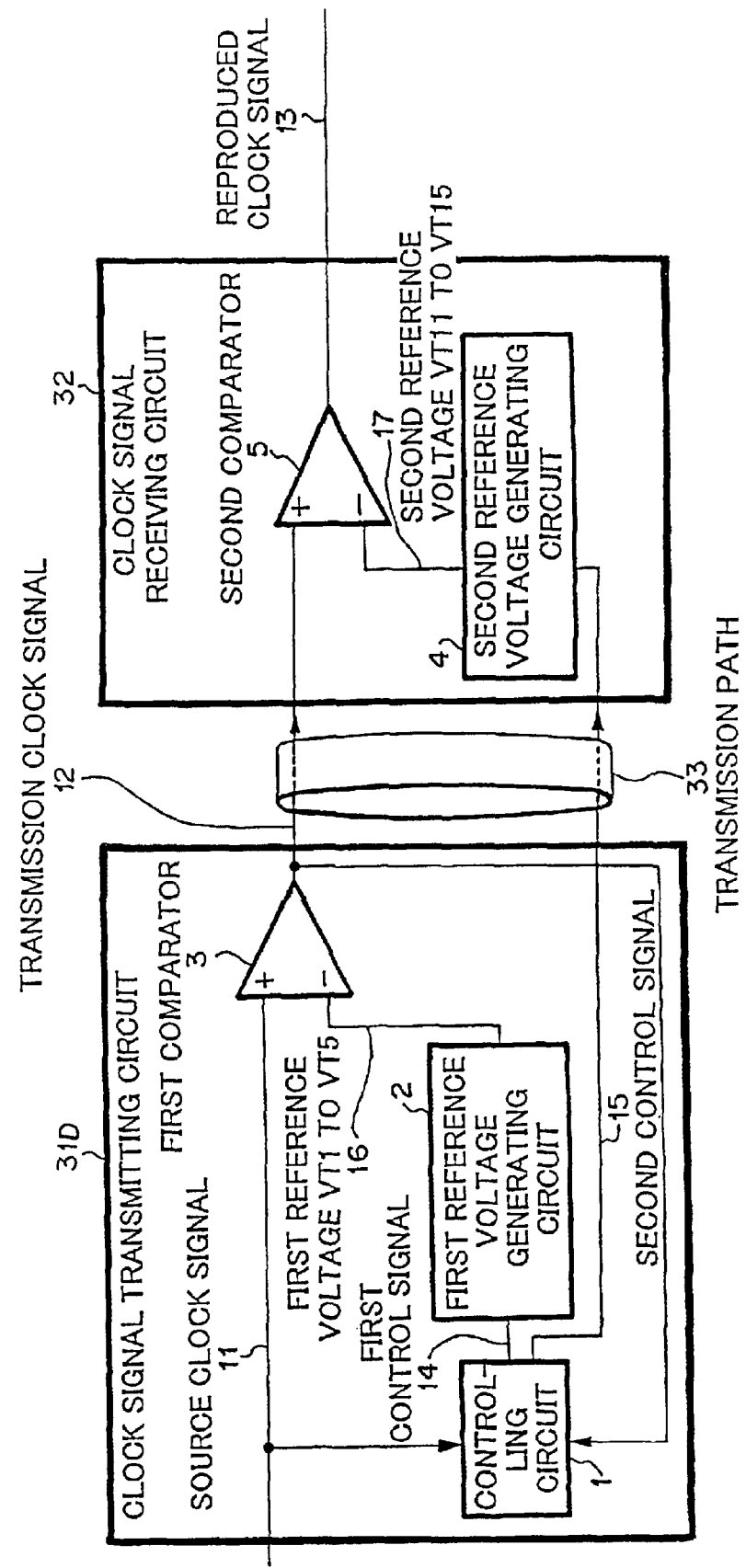
F I G. 12

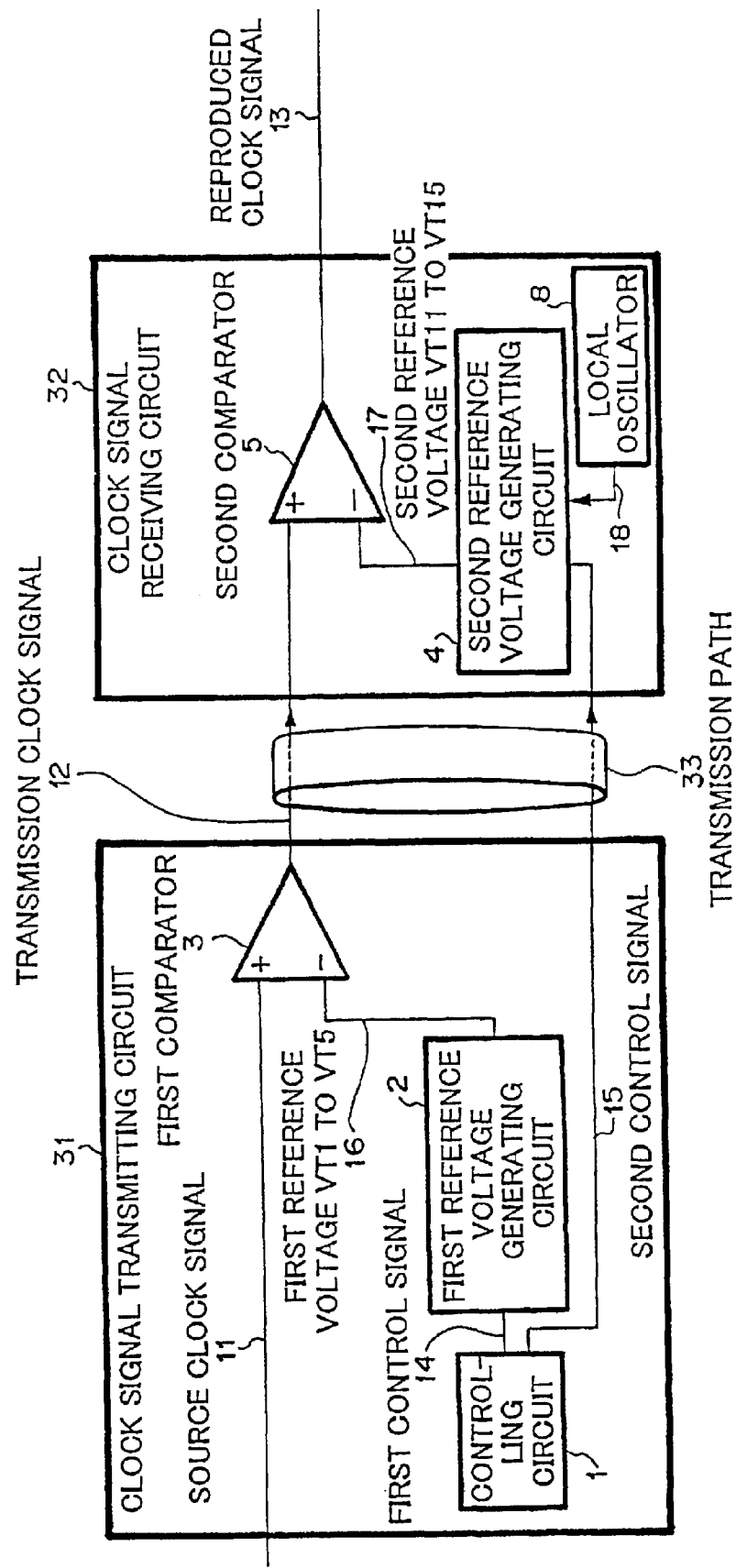
F I G. 22

CLOCK SIGNAL TRANSMITTING SYSTEM, DIGITAL SIGNAL TRANSMITTING SYSTEM, CLOCK SIGNAL TRANSMITTING METHOD, AND DIGITAL SIGNAL TRANSMITTING METHOD

BACKGROUND OF THE INVENTION

1. Field of the Invention

The present invention relates to a system and method for generating a transmission digital signal from a source digital signal and reproducing the source digital signal as a reproduced digital signal from the transmission digital signal, and in particular, to a system and method for suppressing an electromagnetic noise generated by the transmission digital signal. The source digital signal is, for example, a clock signal and a data signal.

2. Prior Art

Since a clock signal is composed of repetitive pulses having the same frequencies, the clock signal has a large spectrum at the clock frequency and its higher harmonic frequencies. When the clock signal is transmitted through a transmission path, the signal radiates electromagnetic noise having these frequencies. A data signal does not have a higher periodicity than the clock signal. However, a video signal and an audio signal which have been band-compressed have a high entropy. Thus, these signals have a high periodicity and large spectrums at ½ frequency of the clock signal and its higher harmonic frequencies. Therefore, a data signal transmitted through a transmission path radiates electromagnetic noise at these frequencies.

Conventionally, in order to suppress the electromagnetic noise, the voltage amplitudes or current amplitudes of a clock signal and a data signal are decreased. In addition, a differential transmission system such as ECL (Emitter-Coupled Logic) is used.

As a prior art reference, a method and apparatus for suppressing the electromagnetic noise are disclosed in JPA 9-289527. According to the prior art reference, a clock signal is frequency-modulated. The frequency of a spectrum generated from the clock signal is dispersed so as to suppress the electromagnetic noise.

In the method and apparatus of the prior art reference disclosed as JPA 9-289527, a source clock signal is frequency-modulated with a particular frequency so that the frequency of the transmission clock signal is dynamically varied. On the reception side, a PLL removes a modulation signal component so that the source clock signal is reproduced. The frequency change ratio of the transmission clock signal which has been frequency-modulated is supposed to be±several percent.

Generally, the lock range and capture range of a PLL are as high as several hundred ppm at the maximum. Thus, in the method and apparatus of the prior art reference, the conventional PLL circuit cannot be used to perform adjustment in a several percent range. Instead, a more complicated circuit is required.

SUMMARY OF THE INVENTION

In order to overcome the disadvantage mentioned above, the present invention has been made and accordingly, has an object to provide a digital signal transmitting system and method which suppress an electromagnetic noise radiated from a transmission digital signal transmitted through a transmission path with a simpler circuit.

According to a first aspect of the present invention, there is provided a clock signal transmitting system, comprising: a controlling circuit for generating a first control signal and a second control signal which contains synchronization information of the first control signal; a first reference voltage generating circuit for generating a first reference voltage which periodically varies corresponding to the first control signal; a second reference voltage generating circuit for generating a second reference voltage which periodically varies corresponding to the second control signal; a first comparator for comparing a source clock signal with the first reference voltage in order to generate a transmission clock signal; and a second comparator for comparing the transmission clock signal with the second reference voltage in order to generate a reproduced clock signal.

The sum of the first reference voltage generated by the first reference voltage generating circuit and the second reference voltage generated by the second reference voltage generating circuit may be a constant voltage.

The first reference voltage generated by the first reference voltage generating circuit and the second reference voltage generated by the second reference voltage generating circuit may periodically vary in the same period.

The first reference voltage generating circuit may switch the first reference voltage at a frequency twice as high as the source clock signal, and the second reference voltage generating circuit may switch the second reference voltage at the frequency twice as high as the source clock signal.

The controlling circuit may be disposed on a transmission side.

The controlling circuit may generate the first control signal and the second control signal on the basis of the source clock signal.

The controlling circuit may generate the first control signal and the second control signal on the basis of the transmission clock signal.

The controlling circuit may generate the first control signal and the second control signal on the basis of the source clock signal and the transmission clock signal.

The controlling circuit may generate the second control signal having a frequency which is lower than a frequency of the source clock signal.

The first reference voltage generating circuit may generate the first reference voltage on the basis of the first control signal and the source clock signal.

The first reference voltage generating circuit may generate the first reference voltage on the basis of the first control signal and the transmission clock signal.

The second reference voltage generating circuit may generate the second reference voltage on the basis of the second control signal and the transmission clock signal.

The second reference voltage generating circuit may generate the second reference voltage on the basis of the second control signal and the reproduced clock signal.

The clock signal transmitting system may further comprise: a local oscillator disposed on a reception side for generating a local clock signal, wherein the second reference voltage generating circuit generates the second reference voltage on the basis of the second control signal and the local clock signal.

The clock signal transmitting system may further comprise: a PLL circuit which inputs the reproduced clock signal as a reference signal in order to output a refined reproduced clock signal.

The clock signal transmitting system may further comprise: a PLL circuit which inputs the reproduced clock signal as a reference signal in order to output a refined reproduced signal, wherein the second reference voltage generating circuit generates the second reference voltage on the basis of the second control signal and the refined reproduced signal.

The clock signal transmitting system may further comprise: a phase compensating circuit for compensating the phase of the reproduced clock signal.

The first control signal may be the same as the second control signal.

According to a second aspect of the present invention, there is provided a digital signal transmitting system, comprising: the above clock transmitting system; a third comparator for comparing a source data signal with the first reference voltage in order to generate a transmission data signal; and a fourth comparator for comparing the transmission data signal with the second reference voltage in order to generate a reproduced data signal.

These and other objects, features and advantages of the present invention will become more apparent in light of the following detailed description of the best modes of embodiment thereof, as illustrated in the accompanying drawings.

BRIEF DESCRIPTION OF DRAWING

FIG. 9A is a circuit diagram showing an example of a change detection signal generating circuit of the controlling circuit according to the second embodiment of the present invention;

FIG. 9B is a timing diagram of the change detection signal generating circuit according to the second embodiment of the present invention;

FIG. 12 is a block diagram showing the structure of a clock signal transmitting system according to a fourth embodiment of the present invention;

FIG. 22 is a block diagram showing the structure of a clock signal transmitting system according to a thirteenth embodiment of the present invention;

DESCRIPTION OF PREFERRED EMBODIMENTS

Next, with reference to the accompanying drawings, embodiments of the present invention will be explained in detail.

[First Embodiment]

First of all, with reference to FIG. 1, the structure of a clock signal transmitting system according to a first embodiment will be explained.

Figure 1:
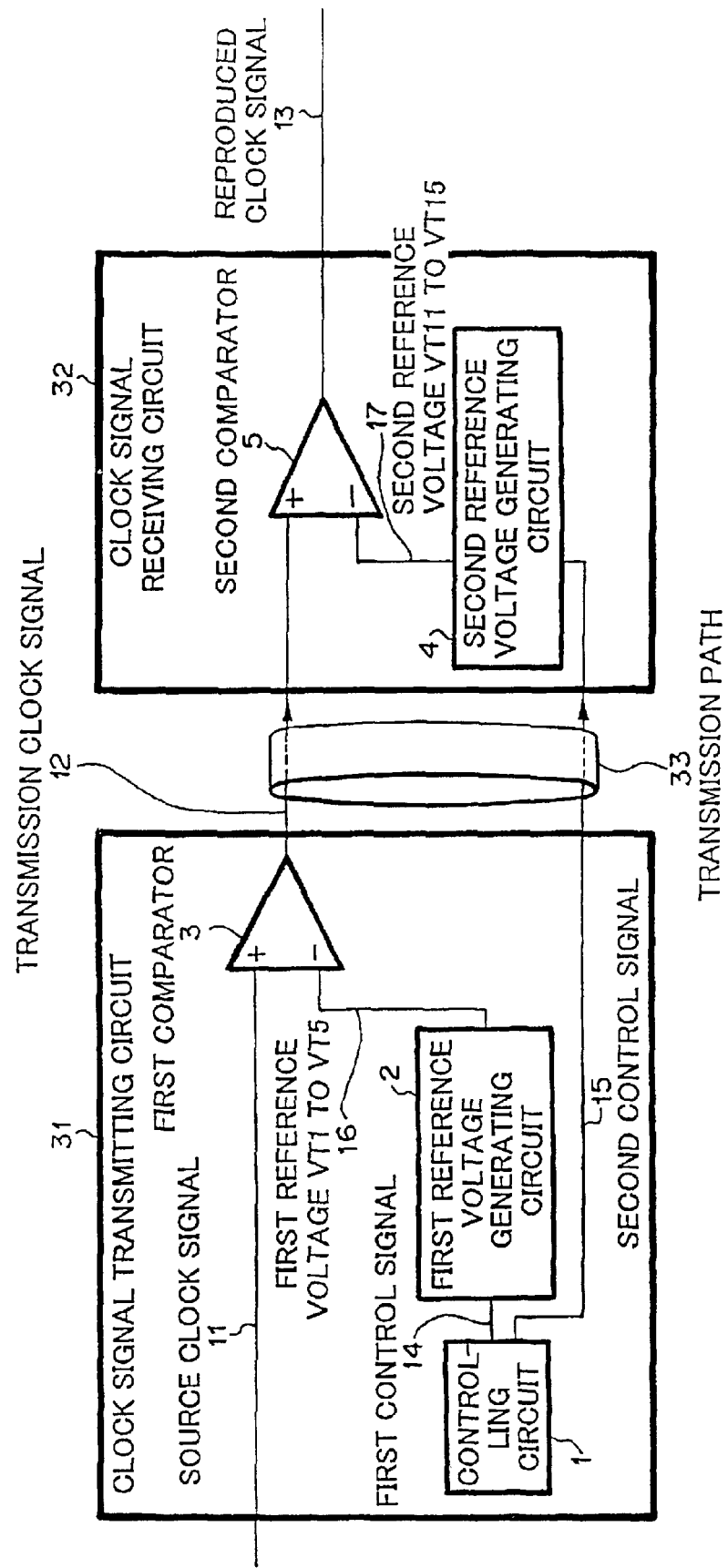
FIG. 1 is a block diagram showing the structure of a clock signal transmitting system according to a first embodiment of the present invention.

Referring to FIG. 1, the clock signal transmitting system according to the first embodiment comprises clock signal transmitting circuit 31 and clock signal receiving circuit 32.

Clock signal transmitting circuit 31 comprises controlling circuit 1, first reference voltage generating circuit 2, and first comparator 3. Controlling circuit 1 generates first control signal 14 and second control signal 15. First control signal 14 and second control signal 15 are used to periodically vary first reference voltage 16 and second reference voltage 17, respectively, and to synchronize voltages 16 and 17. First reference voltage generating circuit 2 determines first reference voltage 16 corresponding to first control signal 14 and outputs first reference voltage 16. First comparator 3 inputs source clock signal 11 and first reference voltage 16, compares them, and outputs transmission clock signal 12 whose frequency periodically varies.

Clock signal receiving circuit 32 comprises second reference voltage generating circuit 4 and second comparator 5.

Second reference voltage generating circuit 4 receives second control signal 15 which is supplied from controlling circuit 1 in clock signal transmitting circuit 31 through transmission path 33, determines second reference voltage 17 corresponding to second control signal 15, and outputs second reference voltage 17. Second comparator 5 inputs transmission clock signal 12 which is supplied from clock signal transmitting circuit 31 through transmission path 33 and whose frequency periodically varies and second reference voltage 17 which is generated in second reference voltage generating circuit 4, compares transmission clock signal 12 with second reference voltage 17, and outputs reproduced clock signal 13 having a single frequency.

Figure 2:
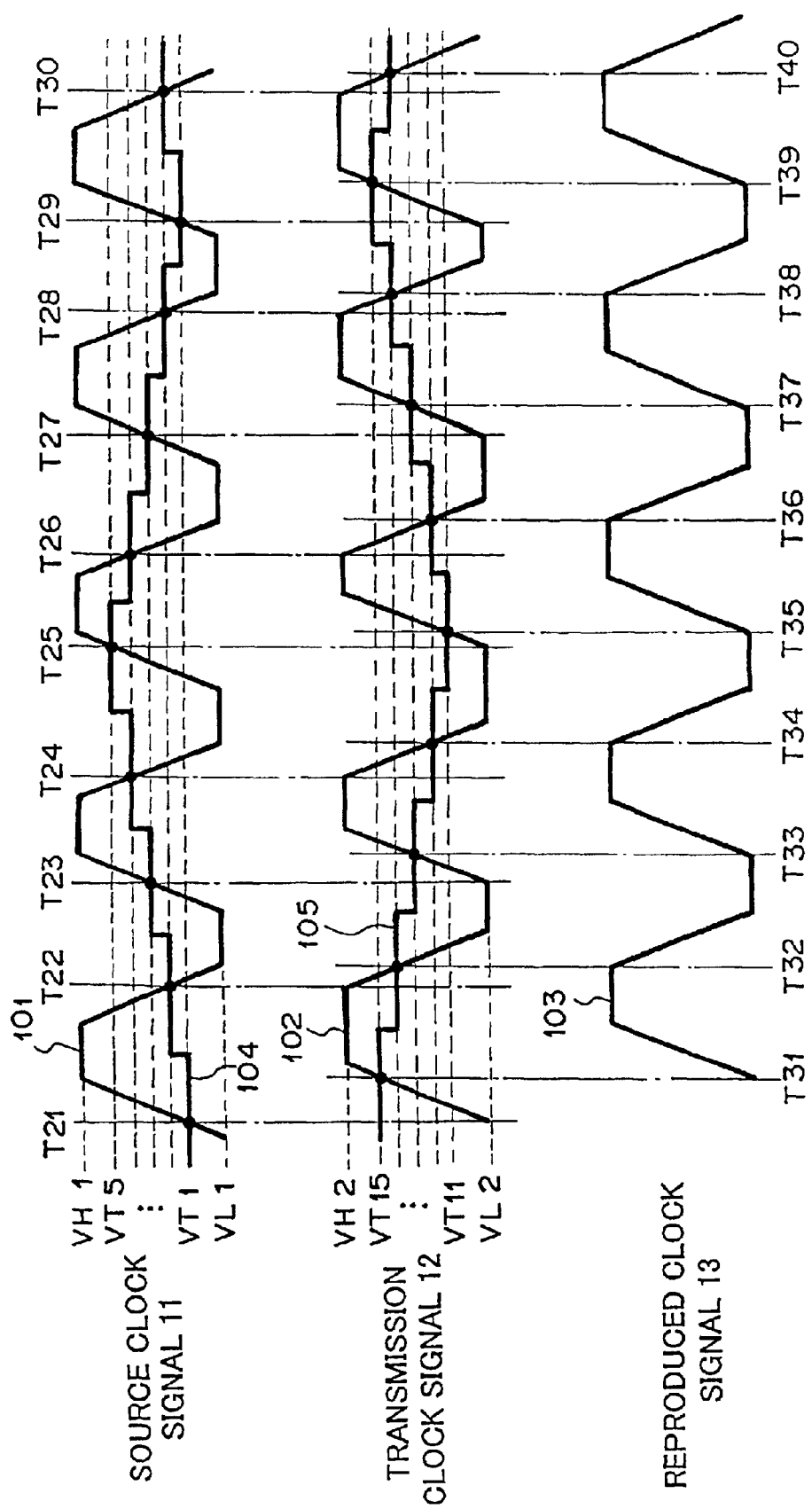
FIG. 2 is a timing diagram showing the operation of the clock signal transmitting system according to the first embodiment of the present invention.

Next, with reference to FIGS. 1 and 2, the operation of the clock signal transmitting system according to the first embodiment will be explained.

First, the operation of clock signal transmitting circuit 31 will be explained.

Source clock signal 11 having waveform 101 is input to a + (plus) input terminal of first comparator 3.

First reference voltage 16 having waveform 104 is input to a − (minus) input terminal of first comparator 3. First reference voltage 16 is generated by first reference voltage generating circuit 2. First reference voltage 16 has five voltage levels, that is, VT1, VT2, VT3, VT4, and VT5 (where VT1<VT2<VT3<VT4<VT5). First reference voltage 16 is in the range of the voltage amplitude of source clock signal 11 which is input to the + input terminal of first comparator 3. In this case, the high level voltage of source clock signal 11 is VH1, whereas the low level voltage of source clock signal 11 is VL1. Thus, the relation of VL1<VT1<VT2<VT3<VT4<VT5<VH1 is satisfied.

First reference voltage 16 which is input to first comparator 3 is selected by controlling circuit 1. Controlling circuit 1 generates first control signal 14 in order that first reference voltage 16 varies in the order of VT1, VT2, VT3, VT4, VT5, VT4, VT3, VT2, VT1, VT2, VT3, . . . whenever the logical level of source clock signal 11 changes. First control signal 14 designates first reference voltage 16. Alternatively, controlling circuit 1 may generate first control signal 14 at intervals of at least one period of first reference voltage 16. First reference voltage generating circuit 2 autonomously switches first reference voltage 16 in synchronization with first control signal 14. In the latter case, when necessary, first reference voltage generating circuit 2 compensates the phase of first control signal 14.

Next, the operation of first comparator 3 will be explained. At the beginning, first reference voltage generating circuit 2 selects VT1 as first reference voltage 16 corresponding to first control signal 14. When the voltage source clock signal 11 becomes VT1 (waveform 101) at time T21, first comparator 3 determines that the logical level of source clock signal 11 becomes high and causes the logical level (waveform 102) of transmission clock signal 12 to be high. After first reference voltage generating circuit 2 causes the voltage level of first reference voltage 16 to be raised to VT2., when the voltage level of source clock signal 11 becomes VT2 at time T22, first comparator 3 causes the logical level (waveform 102) of transmission clock signal 12 to be low. Thereafter, because first reference voltage generating circuit 2 varies the voltage level of first reference voltage 16 as represented by waveform 104, first comparator 4 outputs transmission clock signal 12 are represented by waveform 102. It is apparent that frequency of transmission clock signal 12 (waveform 102) periodically varies. The change amount and change period of the frequency of transmission clock signal 12 depend on the period of source clock signal 11 and the resolution of first reference voltage 16.

Next, the operation of clock signal receiving circuit 32 will be explained.

A + (plus) input terminal of second comparator 5 inputs transmission clock signal 12 supplied from clock signal transmitting circuit 31 through transmission path 33.

Second reference voltage 17 is input to a − (minus) input terminal of second comparator 5. Second reference voltage 17 is generated by second reference voltage generating circuit 4. Second reference voltage 17 has five voltage levels VT11, VT12, VT13, VT14, and VT15 (where VT11<VT12<VT13<VT14<VT15). Second reference voltage 17 is in the range of the voltage amplitude of transmission clock signal 12 which is supplied to second comparator 5. In this case, the voltage of the high level of transmission clock signal 12 is VH2, whereas the voltage of the low level of transmission clock signal 12 is VL2. Thus, the relation of VL2<VT11<VT12<VT13<VT14<VT15<VH2 is satisfied. The number of voltage levels of first reference voltage 16 of clock signal transmitting circuit 31 is the same as the number of voltage levels of second reference voltage 17 of clock signal receiving circuit 32. In addition, as will be explained later, the voltage level of first reference voltage 16 of clock signal transmitting circuit 31 synchronizes with the voltage level of second reference voltage 17 of clock signal receiving circuit 32.

Controlling circuit 1 of clock signal transmitting circuit 31 sends second control signal 15 to second reference voltage generating circuit 4 of clock signal receiving circuit 32. Second control signal 15 contains the synchronization information of first reference voltage 16. Since the phase of first reference voltage 16 is designated by first control signal 14, second control signal 15 also contains the synchronization information of first control signal 14.

For example, even in case first control signal 14 designates first reference voltage 16 whenever first reference voltage 16 should change, controlling circuit 1 only have to send second control signal 15 to second reference voltage generating circuit 4 only when the voltage level of first reference voltage 16 varies from VT1 to VT2. In this case, second reference voltage generating circuit 4 autonomously switches the voltage level of second reference voltage 17 in synchronization with second control signal 15. When necessary, second reference voltage generating circuit 4 compensates the phase of second reference voltage 17 with respect to second control signal 15.

It is tolerable that the frequency of first control signal 14 sent from controlling circuit 1 to first reference voltage generating circuit 2 is twice as high as the frequency of source clock signal 11 from a view point for suppressing electromagnetic noise. However, the frequency of second control signal 15 sent from controlling circuit 1 to second reference voltage generating circuit 4 should be lower than the frequency of source clock signal 11 from a view point for suppressing electromagnetic noise. Second control signal 15 only have to have information at either one of a rising edge or falling edge. Therefore, the duty of second control signal 15 is defined from a view point for suppressing the electromagnetic noise.

However, first control signal 14 and second control signal 15 may be unified into a common control signal. In this case, controlling circuit 1 may generate the common control signal at intervals of at least one period of first reference voltage 16 and second reference voltage 17 and output the common control signal to first reference voltage generating circuit 2 and second reference voltage generating circuit 4. Also in this case, first reference voltage generating circuit 2 and second reference voltage generating circuit 4 autonomously operate in synchronization with common control signal and in predetermined sequences of voltage levels of the reference voltages, respectively.

As the relation of the first reference voltage of clock signal transmitting circuit 31 and the second reference voltage of clock signal receiving circuit 32, VT1 corresponds to VT15; VT2 corresponds to VT14; VT3 corresponds to VT13; VT4 corresponds to VT12; and VT5 corresponds to VT11. In other words, he lowest voltage level of first reference voltage 16 of clock signal transmitting circuit 31 corresponds to the highest voltage level of second reference voltage 17 of clock signal receiving circuit 32. The second lowest voltage level of first reference voltage 16 corresponds to the second highest voltage level of second reference voltage 17. The rest of the voltage levels satisfy the same relation. This the relation of VT1+VT15=VT2+VT14=VT3+VT13=VT4+VT12=VT5+VT11=(a constant voltage) is satisfied. The voltage level of second reference voltage 17 varies in the order of VT15, VT14, VT13, VT12, VT11, VT12, VT13, VT14, VT15, VT14, VT13, and so forth when the logical level of source clock signal 11 changes.

Next, with reference to FIG. 2, the operation of second comparator 5 will be explained. At the beginning, transmission clock signal 12 when VT1 is selected as the voltage level of first reference voltage 16 is transmitted from clock signal transmitting circuit 31 to second comparator 5. At this point, since VT15 has been selected as the voltage level of the second reference voltage by second reference voltage generating circuit 4, when the voltage level (waveform 102) of transmission clock signal 12 becomes VT15 at time T31, second comparator 5 determines that the logical level of transmission clock signal 12 is high and causes the logical level (waveform 103) of reproduced clock signal 13 to be high. Thereafter, second reference voltage generating circuit 4 varies the voltage level of reference voltage 17 to VT14 corresponding to second control signal 15. After transmission clock signal 12 corresponding to VT2 of first reference voltage 16 is transmitted, when the voltage level of transmission clock signal 12 lowers to VT14 at time T32, second reference voltage generating circuit 4 causes the logical level (waveform 103) of reproduced clock signal 13 to be low. Thereafter, the voltage level of second reference voltage 17 varies as represented by waveform 105, and second comparator 5 outputs reproduced clock signal 13 as represented by waveform 103. The period (the period between rising edges and the period between falling edges) and duty of reproduced clock signal 13 are the same as those of source clock signal 11. In other words, reproduced clock signal 13 having the same waveform 103 as waveform 101 of source clock signal 11 is obtained by clock signal receiving circuit 32.

The voltage levels of first reference voltage 16 and second reference voltage 17 selected in a repetitive period may be any voltages as long as first reference voltage generating circuit 2 matches second reference voltage generating circuit 4. Although the voltage levels of first reference voltage 16 and second reference voltage 17 vary whenever the logical level of the clock signal changes in the above explanation, they may vary only when the logical level of the clock signal changes several times.

Next, with reference to flow charts as shown in FIGS. 3 to 7, the operations of the individual blocks of the first embodiment will be explained.

Figure 3:
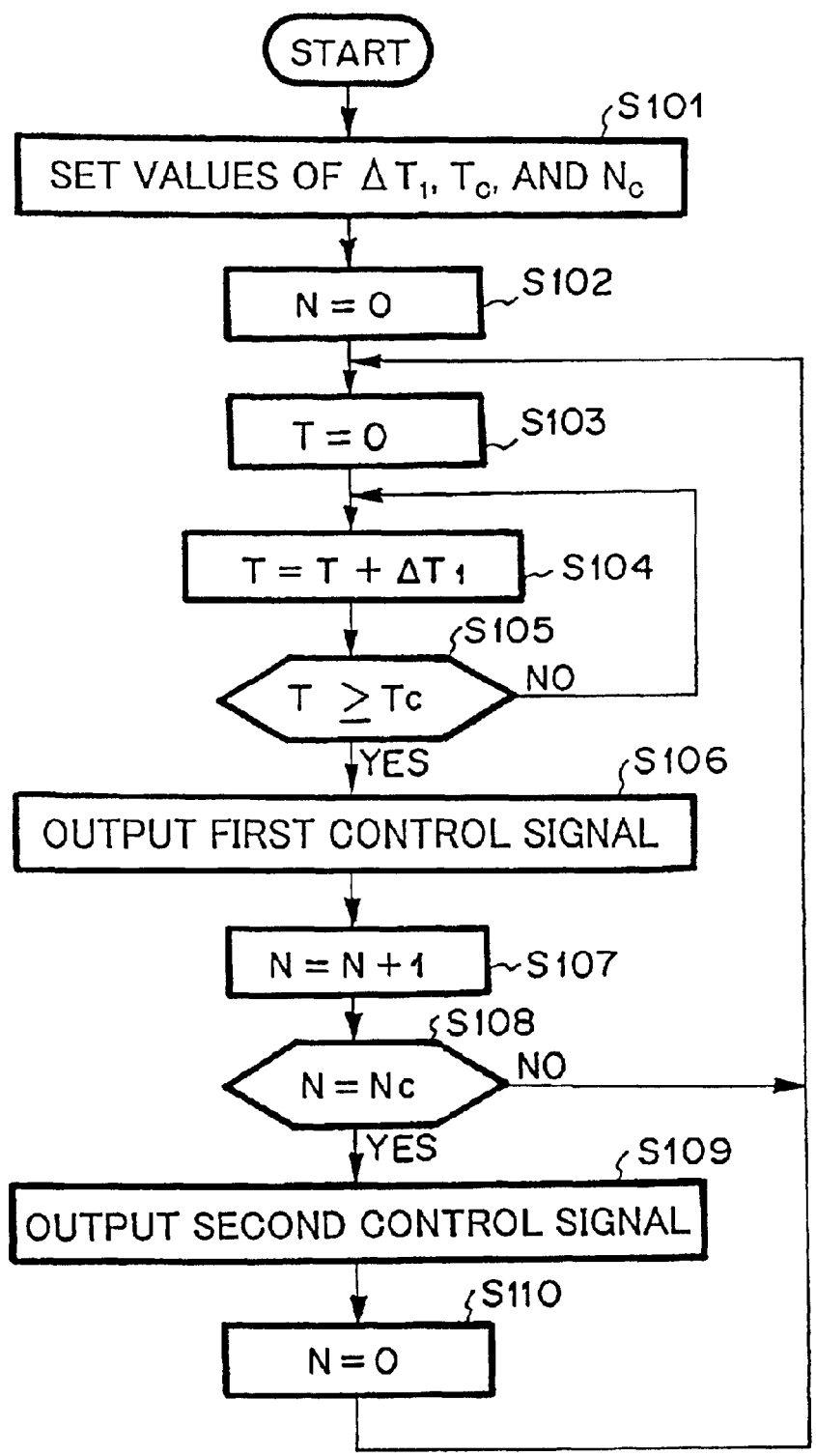
FIG. 3 is a flow chart showing the operation of a controlling circuit according to the first embodiment of the present invention.

First, with reference to FIG. 3, the operation of controlling circuit 1 will be explained.

At step S101, $\Delta T_1$, $T_C$, and $N_C$ are set. $\Delta T_1$ is a time counting unit. $T_C$ is the period in which first control signal 14 is output. $N_C$ is the ratio of the period of second control signal 15 to the period of first control signal 14.

At step S102, N is set to 0. N is a variable used to control the period of second control signal 15. At step S103, T is set to 0. T is a variable used to control the period of first control signal 14. At step S104, $\Delta T_1$ is added to T. At step S105, it is determined whether or not T is equal to or greater than $T_C$. When the determined result at step S105 is Yes, the flow advances to step S106. At step S106, first control signal 14 is output. When the determined result at step S105 is No, the flow returns to step S104. The flow advances from step S106 to step S107. At step S107, N is incremented by 1. At step S108, it is determined whether or not N is equal to $N_C$. When the determined result at step S108 is Yes, the flow advances to step S109. At step S109, second control signal 15 is output. When the determined result at step S108 is No, the flow returns to step S103. The flow advances from step S109 to step S110. At step S110, N is reset to 0. Thereafter, the flow returns to step S103. The value of $T_C$ is represented by $T_C = n \times (T_{CLK}/2)$ (where n is an integer greater than zero; and $T_{CLK}$ is the period of the clock signal). When N is set to 1 at step S101, the period of first control signal 14 is equal to the period of second control signal 15.

Figure 4:
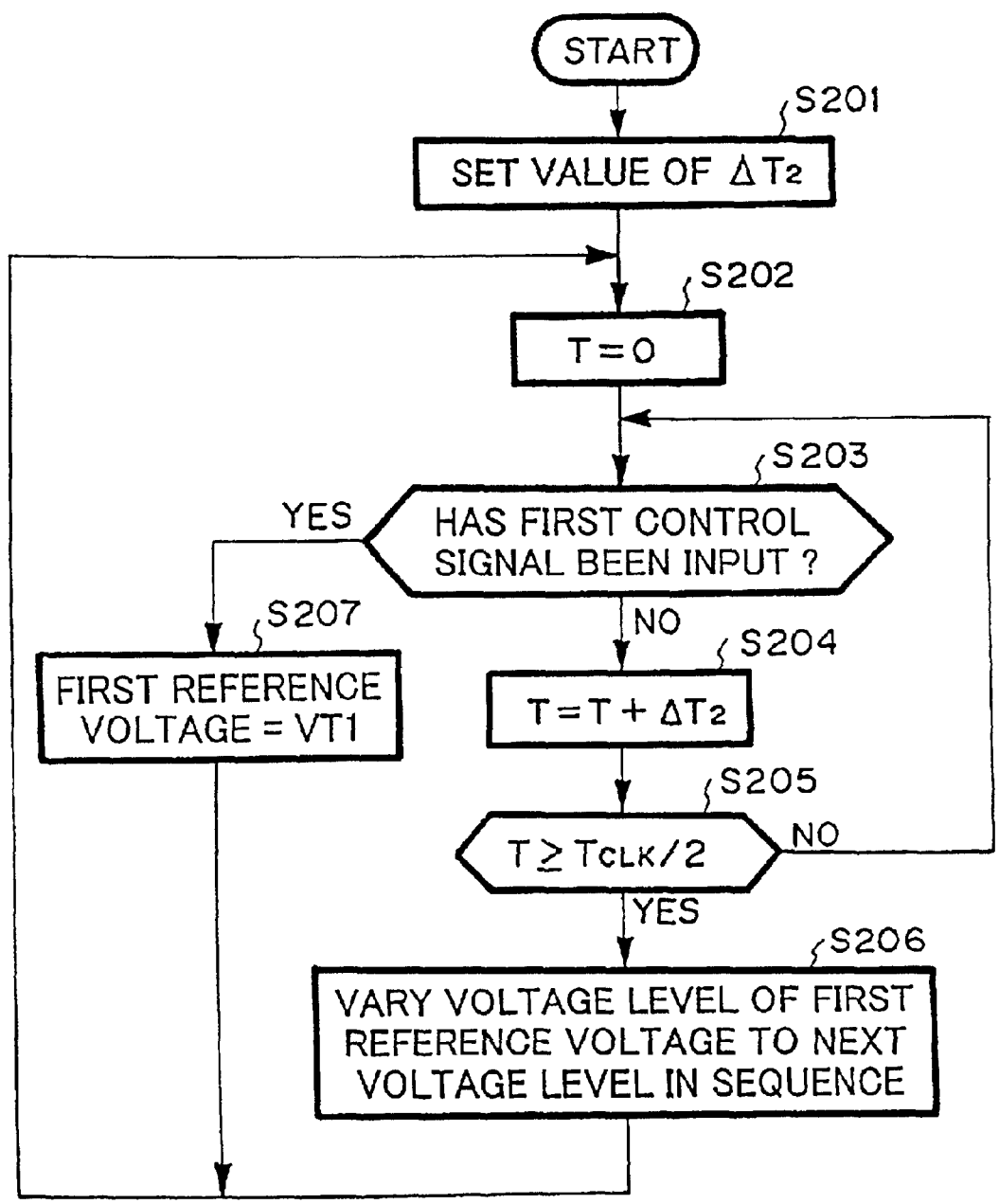
FIG. 4 is a flow chart showing the operation of a first reference voltage generating circuit according to the first embodiment of the present invention.

Next, with reference to FIG. 4, the operation of the first reference voltage generating circuit 2 will be explained.

At step S201, $\Delta T_2$ is set. $\Delta T_2$ is a time counting unit. Thereafter, at step S202, T is set to 0. T is a variable used to control the time at which the voltage level of first reference voltage 16 is varied. Thereafter, at step S203, it is determined whether or not first control signal 14 has been input. When the determined result at step S203 is Yes, the flow advances to step S207. At step S207, the voltage level of first reference voltage 16 is set to VT1. When the determined result at step S203 is No, the flow advances to step S204. At step S204, $\Delta T_2$ is added to T. Thereafter, at step S205, it is determined whether or not T is equal to or larger than $T_{CLK}/2$. When the determined result at step S205 is Yes, the flow advances to step S206. At step S206, the voltage level of first reference voltage 16 is varied to the next voltage level in the sequence. Thereafter, the flow returns to step S202. When the determined result at step S205 is No, the flow returns to step S203.

Figure 5:
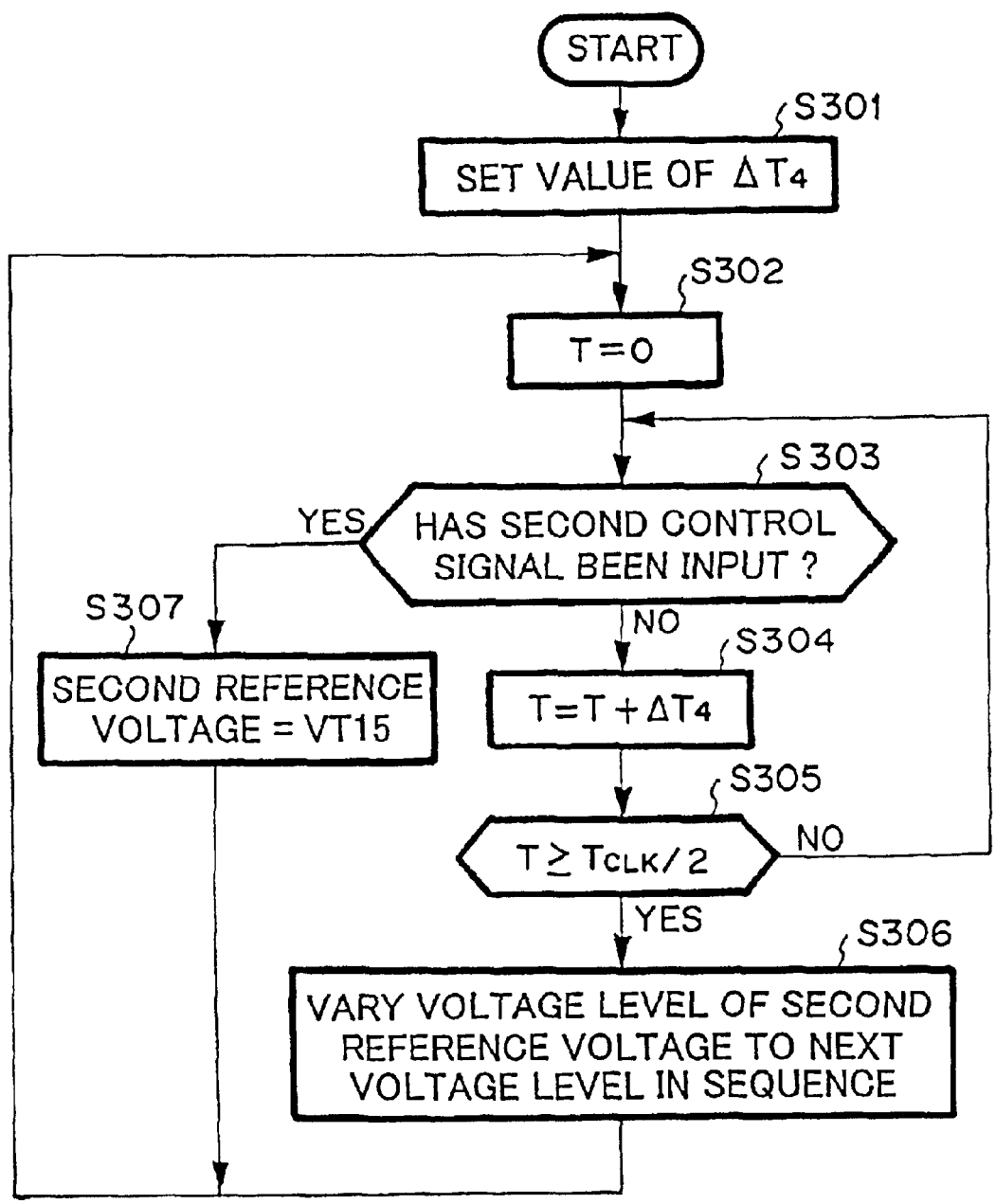
FIG. 5 is a flow chart showing the operation of a second reference voltage generating circuit according to the first embodiment of the present invention.

Next, with reference to FIG. 5, the operation of second reference voltage generating circuit 4 will be explained.

At step S301, $\Delta T_4$ is set. $\Delta T_4$ is a time counting unit. At step S302, T is set to 0. T is a variable used to control the time at which the voltage level of second reference voltage 17 is varied. Thereafter, at step S303, it is determined whether or not second control signal 15 has been input. When the determined result at step S303 is Yes, the flow advances to step S307. At step S307, the voltage level of the first reference voltage 16 is set to VT15. When the determined result at step S303 is No, the flow advances to step S304. At step S304, $\Delta T_4$ is added to T. Thereafter, the flow advances to step S305. At step S305, it is determined whether or not T is equal to or larger than $T_{CLK}/2$. When the determined result at step S305 is Yes, the flow advances to step S306. At step S306, the voltage level of second reference voltage 17 is varied to the next voltage level in the sequence. Thereafter, the flow returns to step S302. When the determined result at step S305 is No, the flow returns to step S303.

Figure 6:
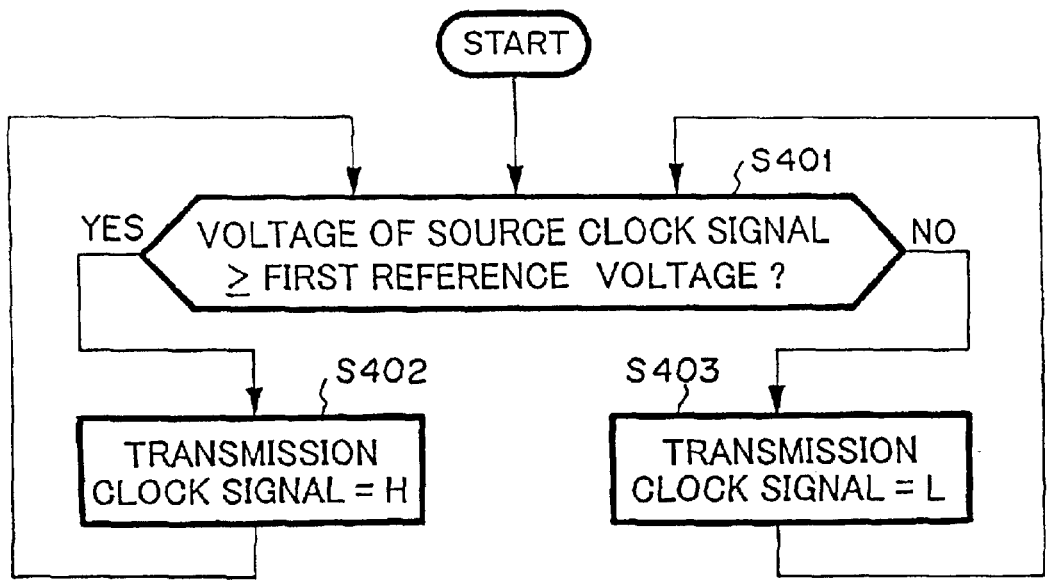
FIG. 6 is a flow chart showing the operation of a first comparator according to the first embodiment of the present invention.

Next, with reference to FIG. 6, the operation of the first comparator 3 will be explained.

At step S401, it is determined whether or not the voltage of source clock signal 11 is equal to or higher than first reference voltage 16. When the determined result at step S401 is Yes, the flow advances to step S402. When the determined result at step S401 is No, the flow advances to step S403. At step S402, the logical level of transmission clock signal 12 is set to high. Thereafter, the flow returns to step S401. At step S403, the logical level of transmission clock signal 12 is set to low. Thereafter, the flow returns to step S401.

Figure 7:
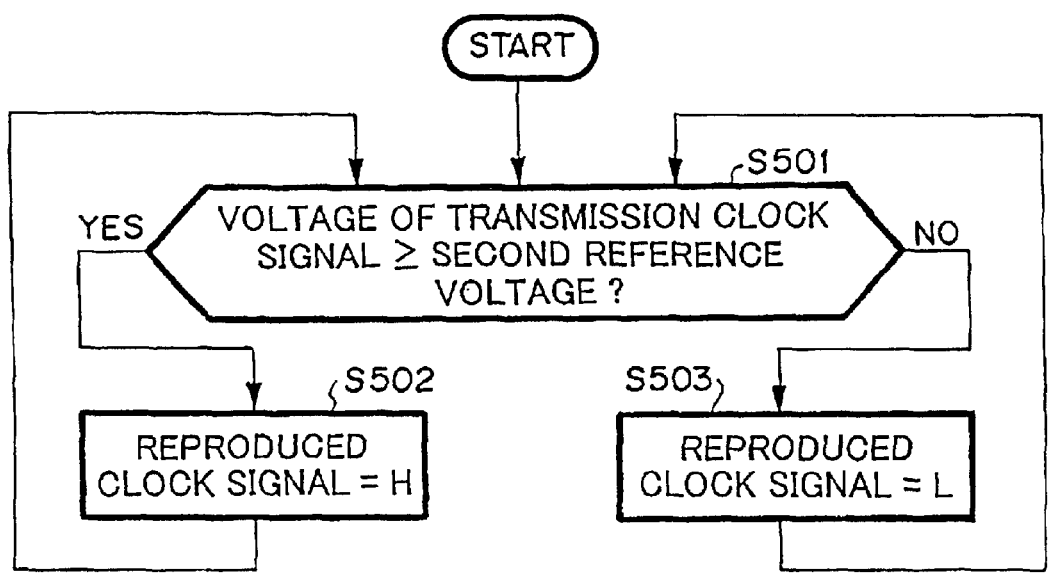
FIG. 7 is a flow chart showing the operation of a second comparator according to the first embodiment of the present invention.

Next, with reference to FIG. 7, the operation of second comparator 5 will be explained.

At step S501, it is determined whether or not the voltage of the transmission clock signal 12 is equal to or higher than second reference voltage 17. When the determined result at step S501 is Yes, the flow advances to step S502. When the determined result at step S501 is No, the flow advances to step S503. At step S502, the logical level of reproduced clock signal 13 is set to high. Thereafter, the flow returns to step S501. At step S503, the logical level of reproduced clock signal 13 is set to low. Thereafter, the flow returns to step S501.

[Second Embodiment]

Figure 8:
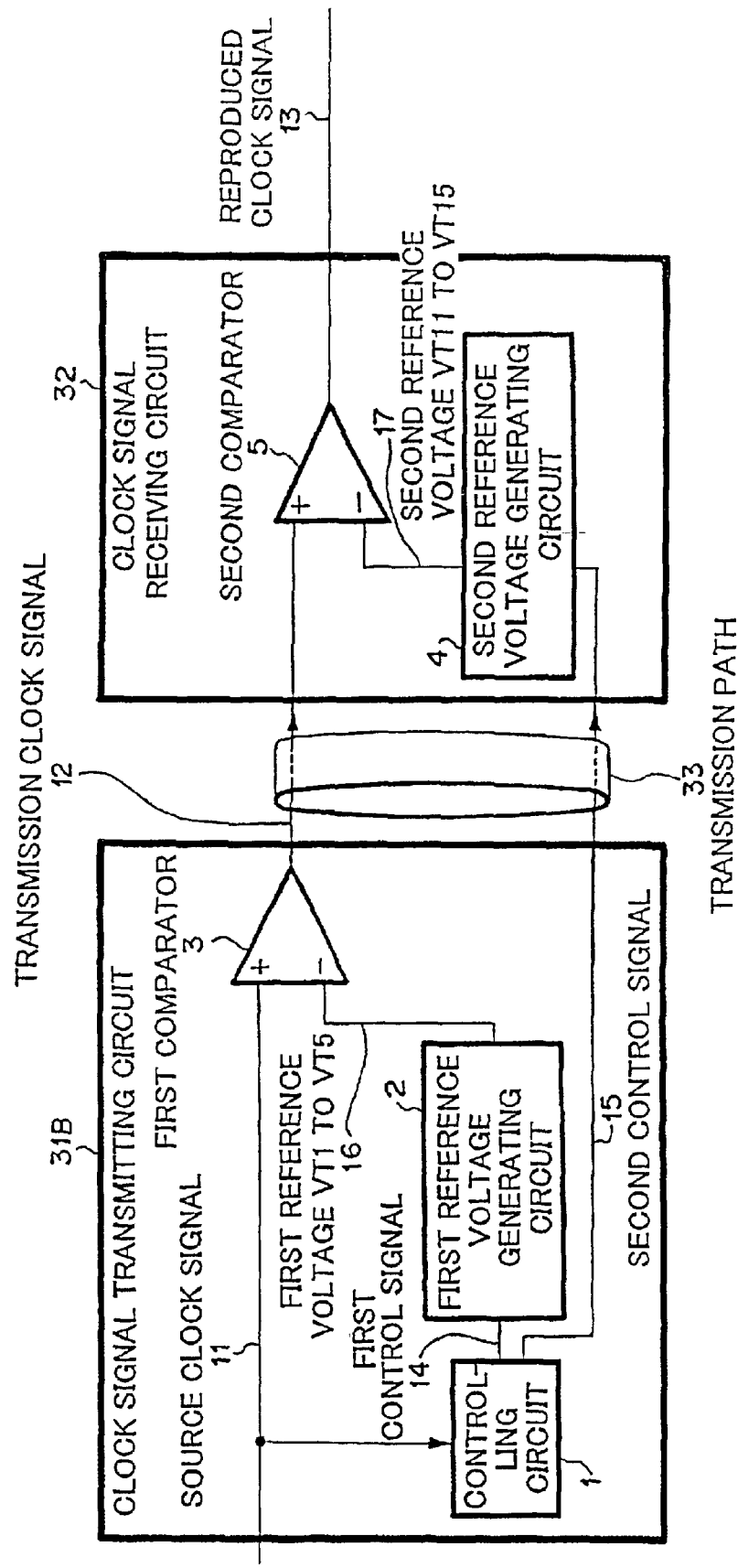
FIG. 8 is a block diagram showing the structure of a clock signal transmitting system according to a second embodiment of the present invention.

According to a second embodiment of the present invention shown in FIG. 8, controlling circuit 1 inputs source clock signal 11 and detects the timing at which the voltage level of the waveform of source clock signal 11 becomes VH1 and the timing at which the voltage level of the waveform of source clock signal 11 becomes VL1. Corresponding to these timings, controlling circuit 1 generates first control signal 14 and second control signal 15. This operation is based on the principle that when the voltage level of source clock signal 11 is varied, the voltage levels of first reference voltage 16 and second reference voltage 17 should be varied. First control signal 14 is output whenever the voltage level of the waveform of source clock signal 11 becomes VH1 or VL1. Alternatively, first control signal 14 is output every time when one or more period of first reference voltage 16 and second reference voltage 17 elapse. Second control signal 15 is output every time when one or more period of first reference voltage 16 and second reference voltage 17 elapse. First control signal 14 and second control signal 15 may be unified. In this case, first reference signal 14 and second control signal 15 are simultaneously output every time when one or more period of first reference voltage 16 and second reference voltage 17 elapse.

Next, with reference to FIGS. 9A, 9B, and 10, the structure and the operation of controlling circuit 1 according to the second embodiment of the present invention will be explained.

The timings at which the voltage level of the waveform of source clock signal 11 becomes VH1 and VL1 are detected by supplying source clock signal 11 to a circuit shown in FIG. 9A and observing the timing at which the logical level of a change detection signal becomes high. FIG. 9B shows waveforms of the input signal of the circuit shown in FIG. 9A and the change detection signal.

Figure 10:
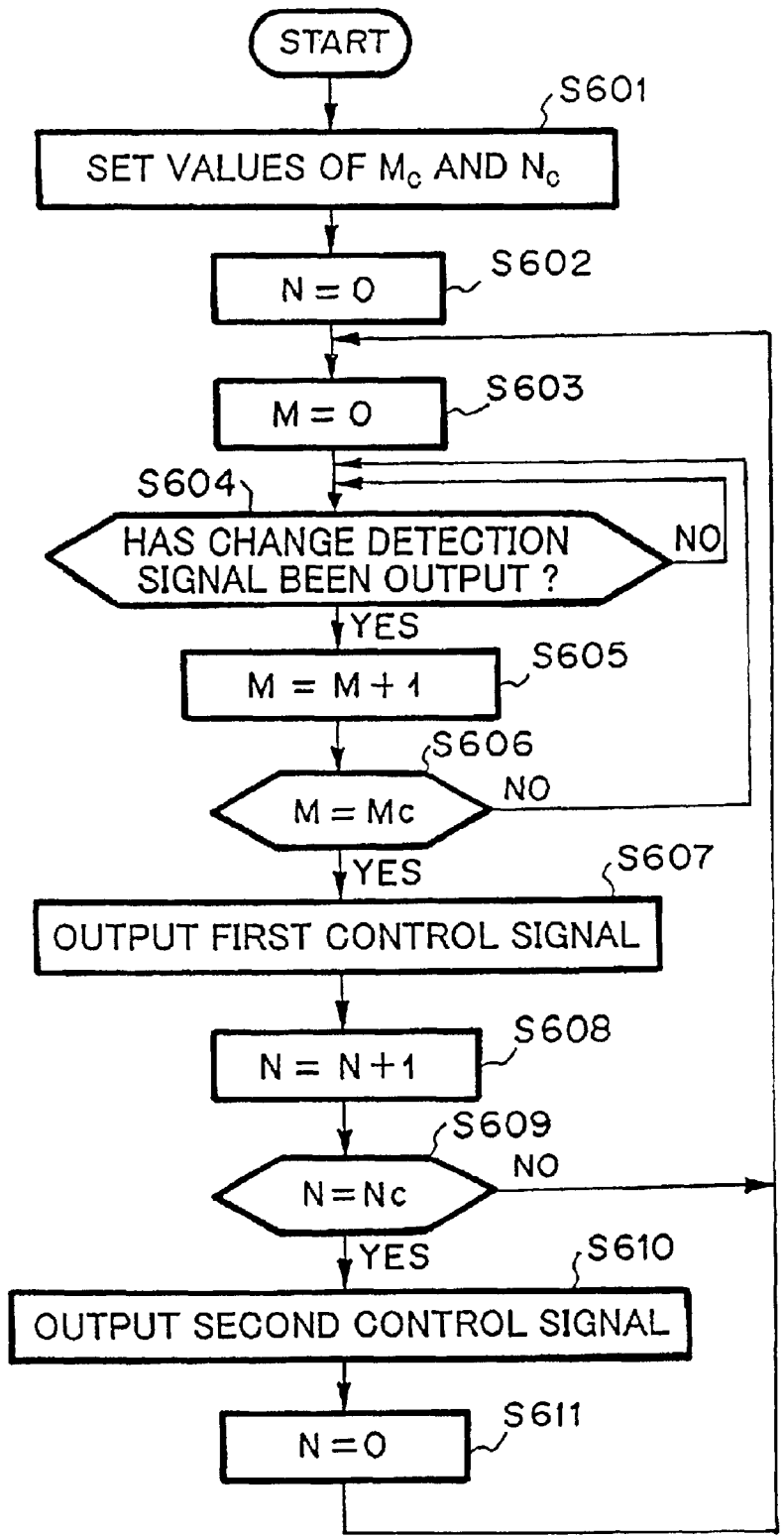
FIG. 10 is a flow chart showing the operation of the controlling circuit according to the second embodiment of the present invention.

Referring to FIG. 10, at step S601, $M_C$ and $N_C$ are set. $M_C$ represetnts the ratio of the period of first control signal 14 to the period of the clock signal. $N_C$ represents the ratio of the period of second control signal 15 to the period of first control signal 14. Thereafter, at step S602, N is set to 0. N is a variable used to control the period of first control signal 14. Thereafter, at step S603, M is set to 0. M is a variable used to control the period of second control signal 15. Thereafter, at step S604, it is determined whether or not the change detecting signal has been output from the circuit shown in FIG. 9A. When the determined result at step S604 is Yes, the flow advances to step S605. When the determined result at step S604 is No, the flow returns to step S604. At step S605, M is incremented by 1. Thereafter, at step S606, it is determined whether or not M is equal to $M_C$. When the determined result at step S606 is Yes, the flow advances to step S607. when the determined result at step S606 is No, the flow returns to step S604. At step S607, the first control signal is output. Thereafter, at step S608, N is incremented by 1. Thereafter, at step S609, it is determined whether or not N is equal to $N_C$. When the determined result at step S609 is Yes, the flow advances to step S610. When the determined result at step S609 is No, the flow returns to step S603. At step S610, the second control signal is output. Thereafter, at step S611, N is set to 0. Thereafter, the flow returns to step S603.

[Third Embodiment]

Figure 11:
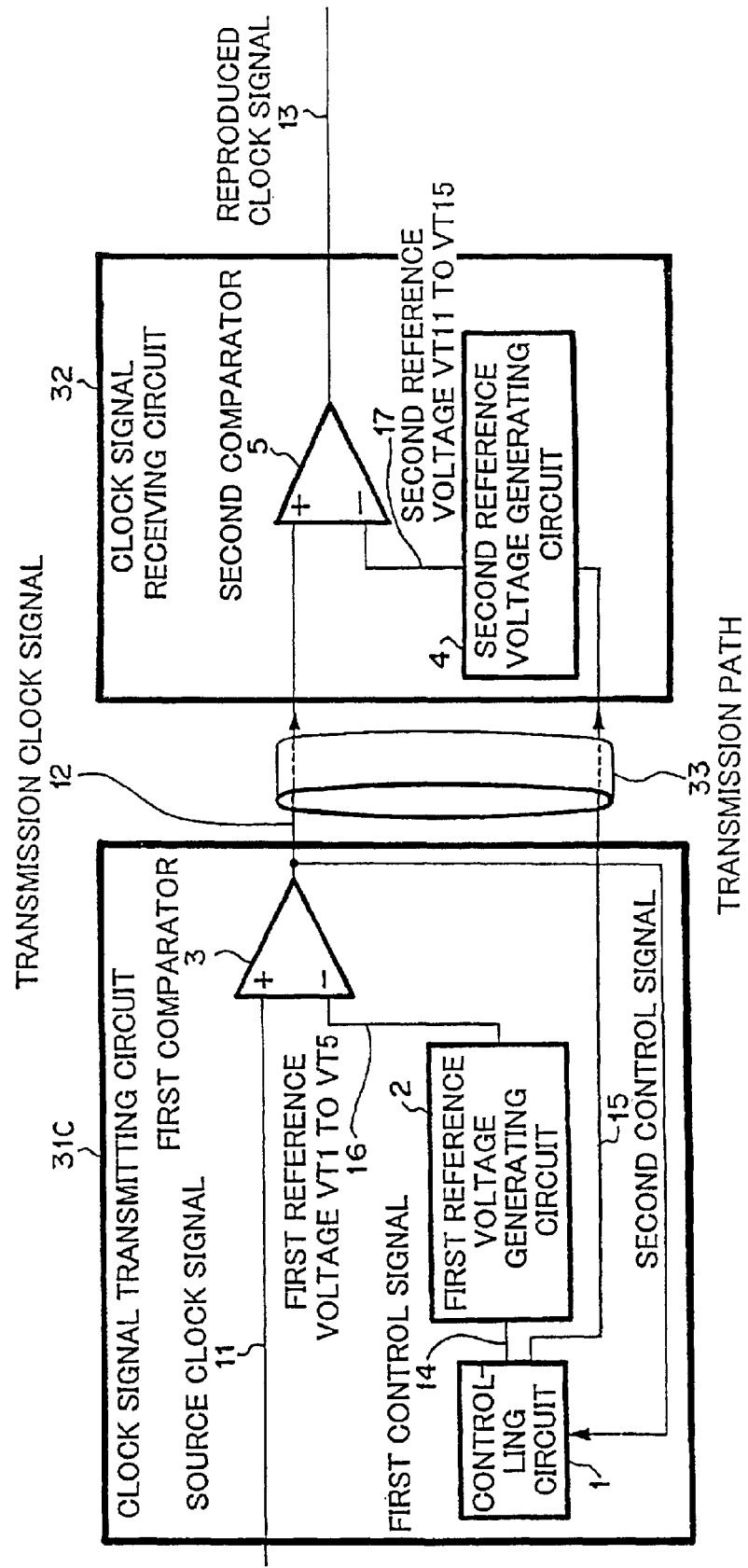
FIG. 11 is a block diagram showing the structure of a clock signal transmitting system according to a third embodiment of the present invention.

According to a third embodiment of the present invention shown in FIG. 11, controlling circuit 1 inputs transmission clock signal 12, detects the timings at which the voltage level of the waveform of transmission clock signal 12 becomes VH2 and the timings at which the voltage level of the waveform of transmission clock signal 12 becomes VL2, and generates first control signal 14 and second control signal 15 corresponding to these detection timings. This operation is based on the principle that when the voltage level of transmission clock signal 12 is varied, the voltage level of the second reference voltage 17 may be varied and the voltage level of first reference voltage 16 may be varied. It is not too late to vary the voltage of first reference voltage 16 when the voltage level of transmission clock signal 12 is changed. First control signal 14 is output whenever the voltage level of the waveform of source clock signal 11 becomes VH1 or VL1. Alternatively, first control signal 14 is output every time when one or more period of first reference voltage 16 and second reference voltage 17 elapse. Second control signal 15 is output every time when one or more period of first reference voltage 16 and second reference voltage 17 elapse. First control signal 14 and second control signal 15 may be unified. In this case, first reference signal 14 and second control signal 15 are simultaneously output every time when one or more period of first reference voltage 16 and second reference voltage 17 elapse.

Since the structure and operation of the controlling circuit 1 according to the third embodiment are the same as those according to the second embodiment (see FIGS. 9 and 10), the redundant description is omitted.

[Fourth Embodiment]

According to a fourth embodiment of the present invention shown in FIG. 12, controlling circuit 1 inputs source clock signal 11 and transmission clock signal 12, detects the timings at which the voltage level of the waveform of source clock signal 11 becomes VH1 and timings at which the voltage level of the waveform of source clock signal 11 becomes VL1, generates first control signal 14 corresponding to the detection timings, detects the timings at which the voltage level of the waveform of transmission clock signal 12 becomes VH2 and timings at which the voltage level of the waveform of transmission clock signal 12 becomes VL2, and generates second control signal 15 corresponding to the detection timings. This operation is based on the principle that when the voltage level of source clock signal 11 is varied, the voltage level offirst reference voltage 16 can be varied, and when the voltage level of transmission clock signal 12 is varied, the voltage level of first reference voltage 16 can be varied. First control signal 14 is output whenever the voltage level of the waveform of source clock signal 11 becomes VH1 or VL1. Alternatively, first control signal 14 is output every time when one or more period of first reference voltage 16 and second reference voltage 17 elapse. Second control signal 15 is output every time when one or more period of first reference voltage 16 and second reference voltage 17 elapse.

Since the structure and operation of the controlling circuit 1 according to the fourth embodiment of the present invention are the same as those according to the second embodiment, the redundant description is omitted.

Controlling circuit 1 may generates first control signal 14 and second control signal 15 at the timing at which the logical level of source clock signal 11 becomes identical with the logical level of transmission clock signal 12. In this case, similarly to the second embodiment and the third embodiment, first control signal 14 and second control signal 15 may be unified.

[Fifth Embodiment]

Figure 13:
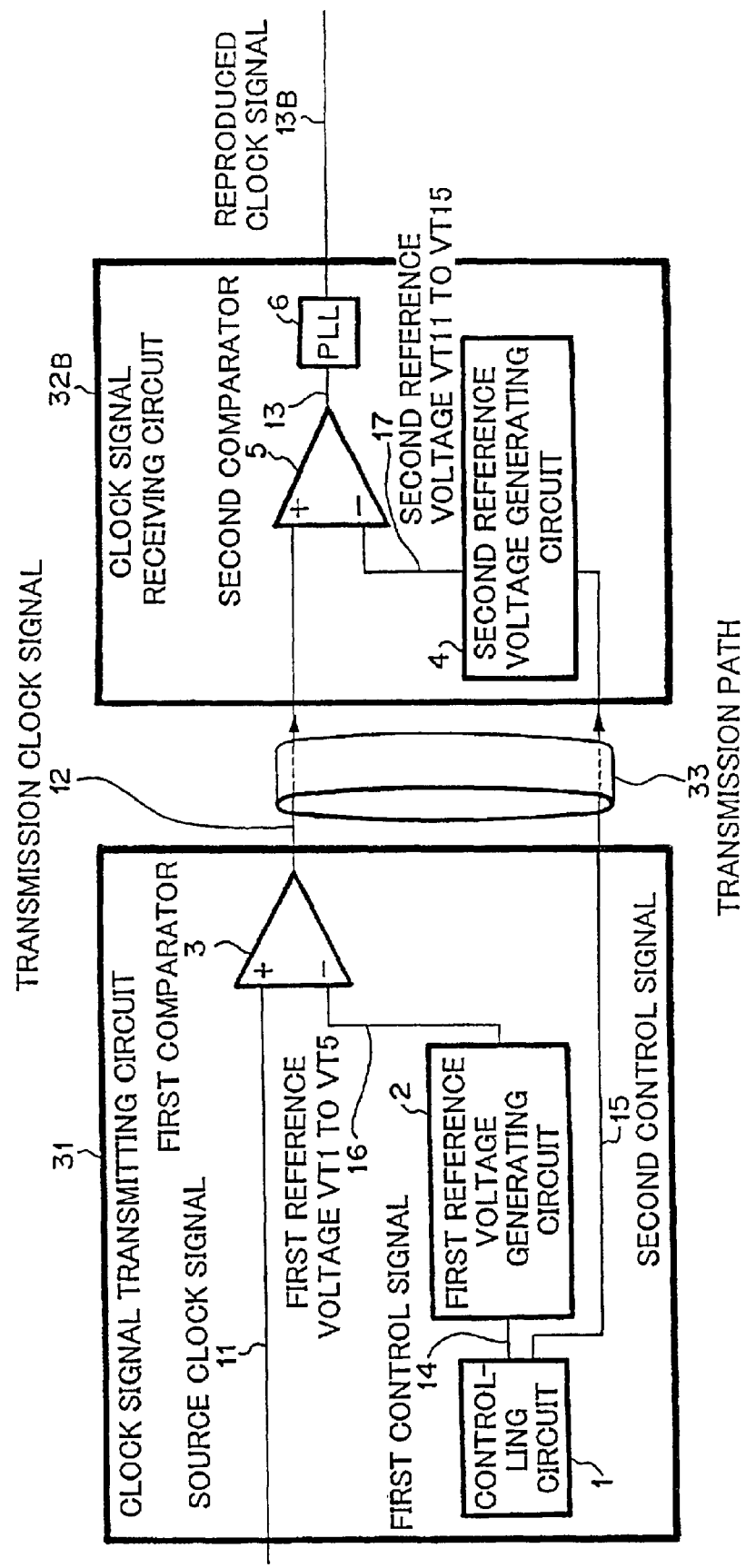
FIG. 13 is a block diagram showing the structure of a clock signal transmitting system according to a fifth embodiment of the present invention.

According to a fifth embodiment of the present invention shown in FIG. 13, a PLL 6 is disposed. Thus, clock signal receiving circuit 32B is used in the place of clock signal receiving circuit 32. PLL 6 inputs reproduced clock signal 13 as a reference signal from second comparator 5 to output reproduced clock signal 13B. The fifth embodiment is used when high accuracy of the frequency of the clock signal is required. Since certain accuracy of the frequency of reproduced clock signal 13 is obtained, a conventional PLL may be used as PLL 6. Thus, a reproduced clock signal with desired accuracy can be obtained without need to use a complicated PLL circuit which compensates the frequency fluctuation of several percent.

[Sixth Embodiment]

Figure 14:
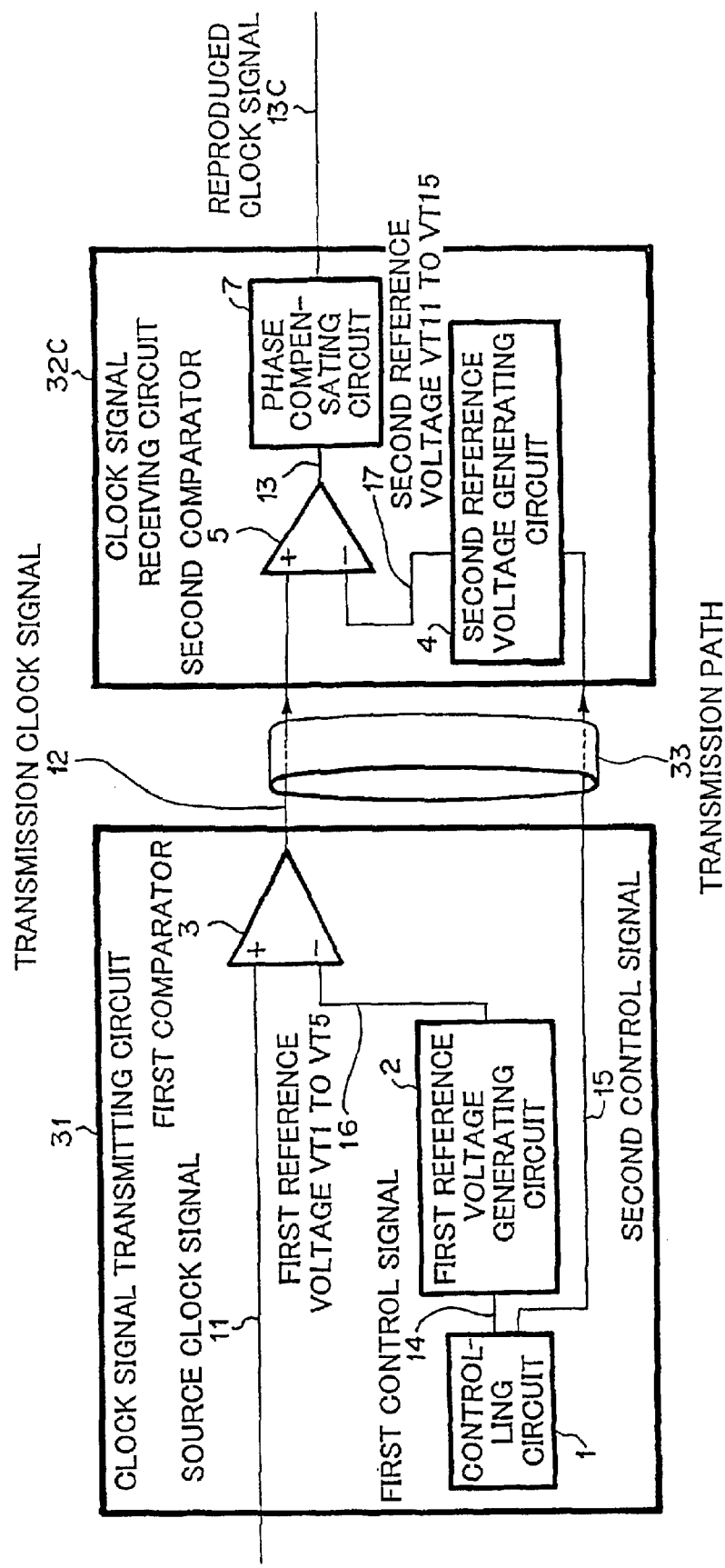
FIG. 14 is a block diagram showing the structure of a clock signal transmitting system according to a sixth embodiment of the present invention.

Since there is a phase difference between source clock signal 11 and reproduced clock signal 13, phase compensating circuit 7 as shown in FIG. 14 may be disposed at the following stage of the second comparator 5 in order to have the phase difference of reproduced clock signal 13 to a data signal (not shown) be equal to the phase difference of source clock signal 11 to the data signal (not shown).

[Seventh Embodiment]

Figure 15:
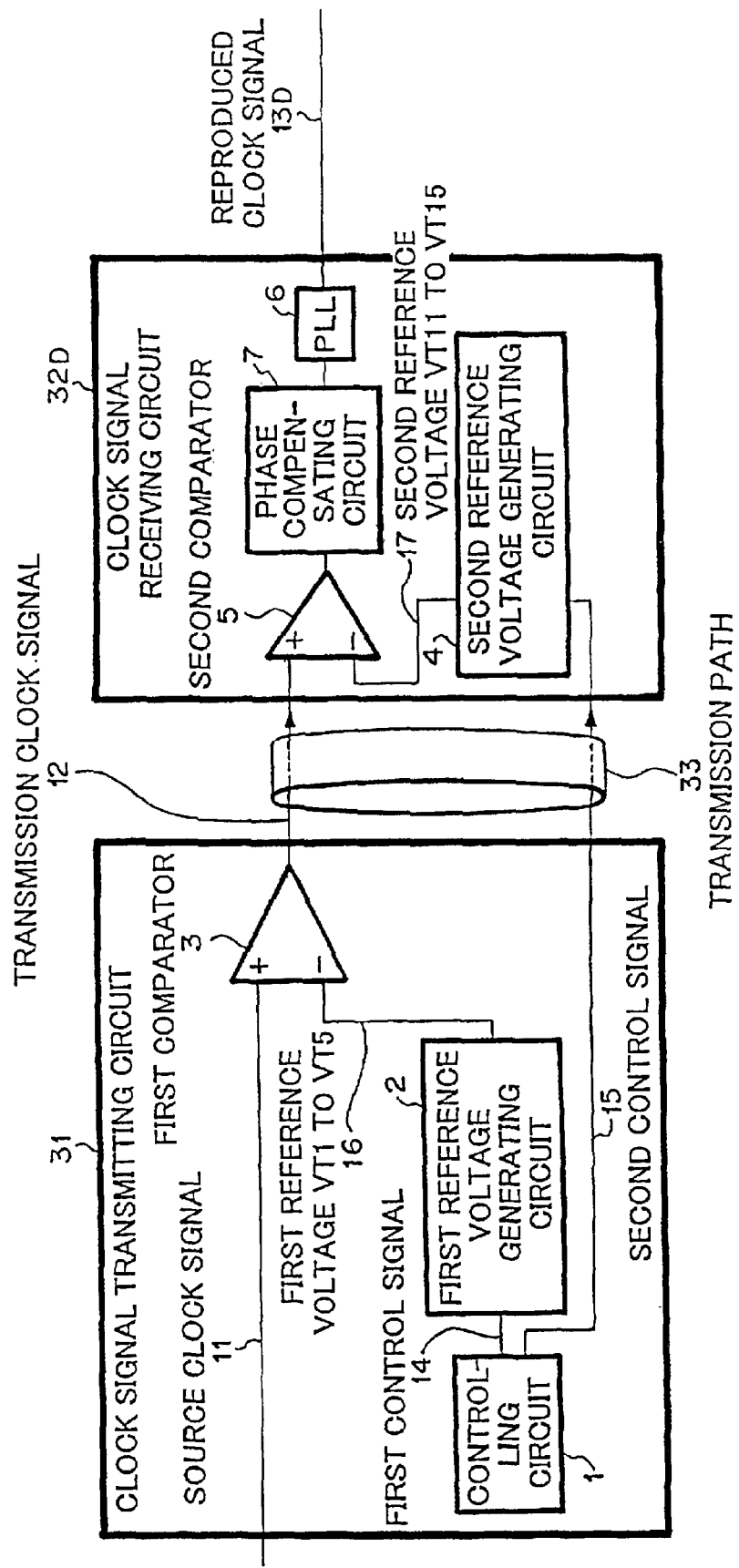
FIG. 15 is a block diagram showing the structure of a clock signal transmitting system according to a seventh embodiment of the present invention.

In order to attain the same purpose as the sixth embodiment, as shown in FIG. 15, phase compensating circuit 7 may be disposed between second comparator 5 and PLL 6.

[Eighth Embodiment]

Figure 16:
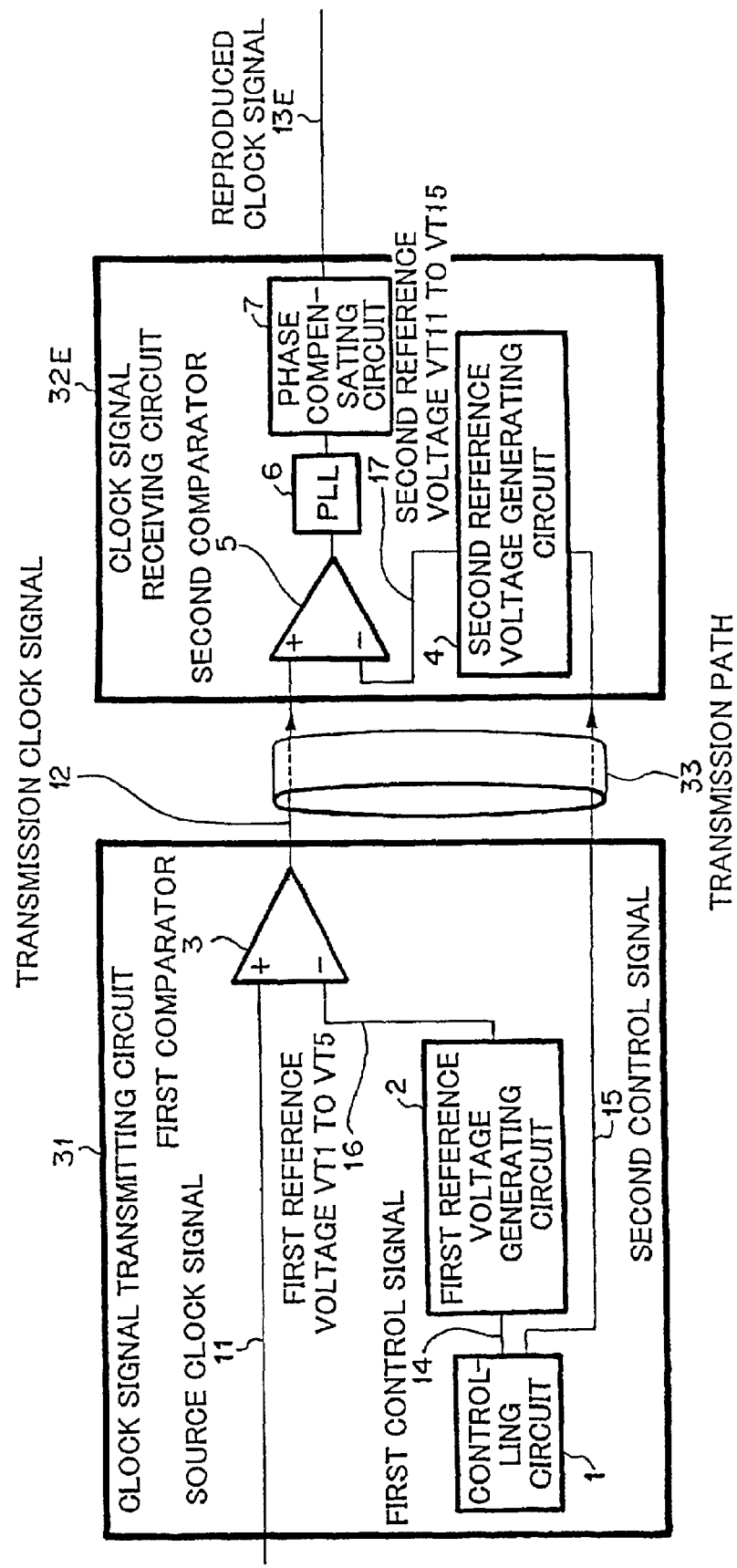
FIG. 16 is a block diagram showing the structure of a clock signal transmitting system according to an eighth embodiment of the present invention.

In order to attain the same purpose as the sixth embodiment, as shown in FIG. 16, phase compensating circuit 7 may be disposed at the following stage of PLL 6.

[Ninth Embodiment]

Figure 17:
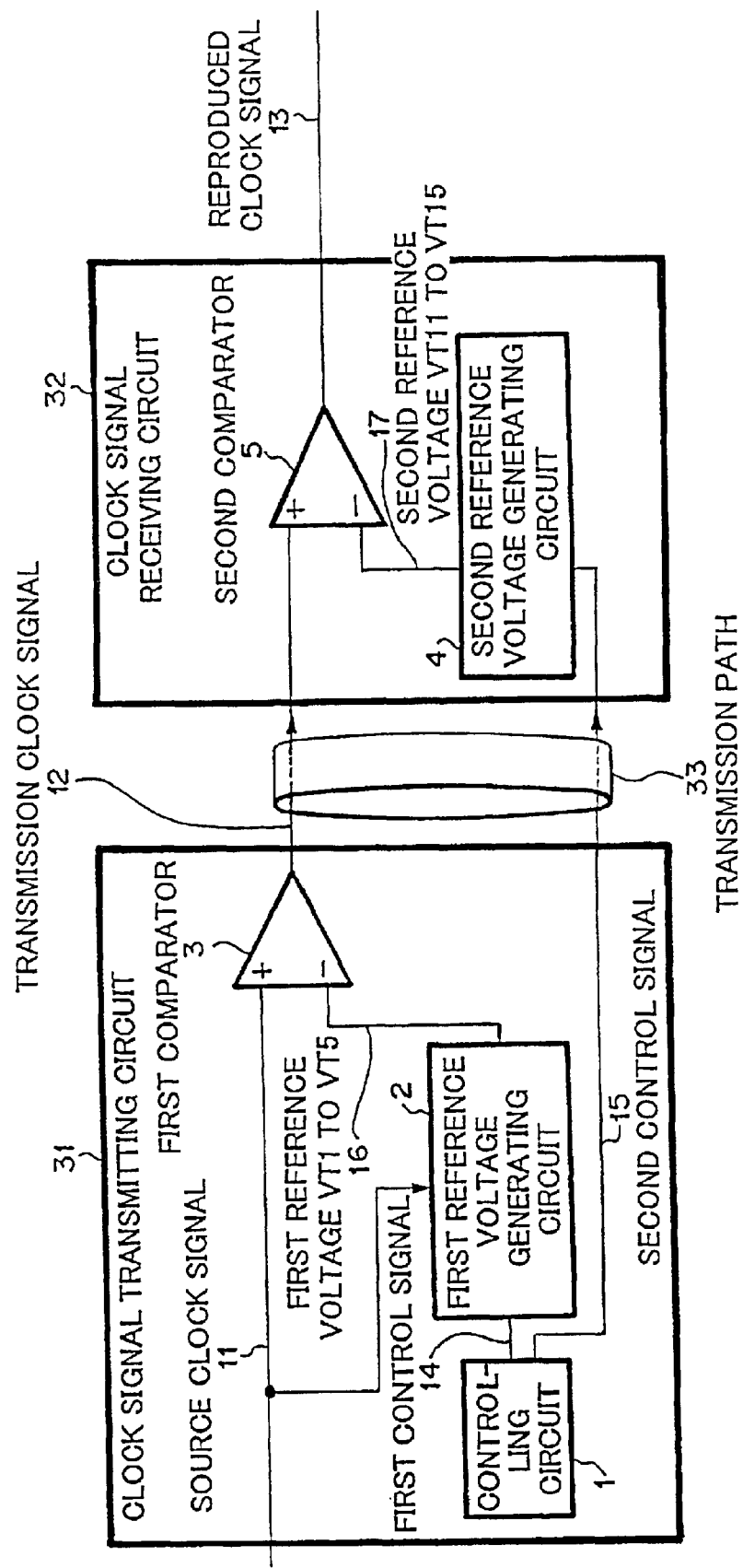
FIG. 17 is a block diagram showing the structure of a clock signal transmitting system according to a ninth embodiment of the present invention.

According to a ninth embodiment of the present invention shown in FIG. 17, controlling circuit 1 outputs first control signal 14 to first reference voltage generating circuit 2 every time when one or more periods of first reference voltage 16 and second reference voltage 17 elapse. First reference voltage generating circuit 2 inputs source clock signal 11 and first control signal 14 and causes a built-in flywheel circuit to use source clock signal 11 as a clock signal and first control signal 14 as a phase synchronization signal so as to generate first reference voltage 16.

Next, with reference to FIG. 18, the operation of first reference voltage generating circuit 2 according to the ninth embodiment will be explained.

Figure 18:
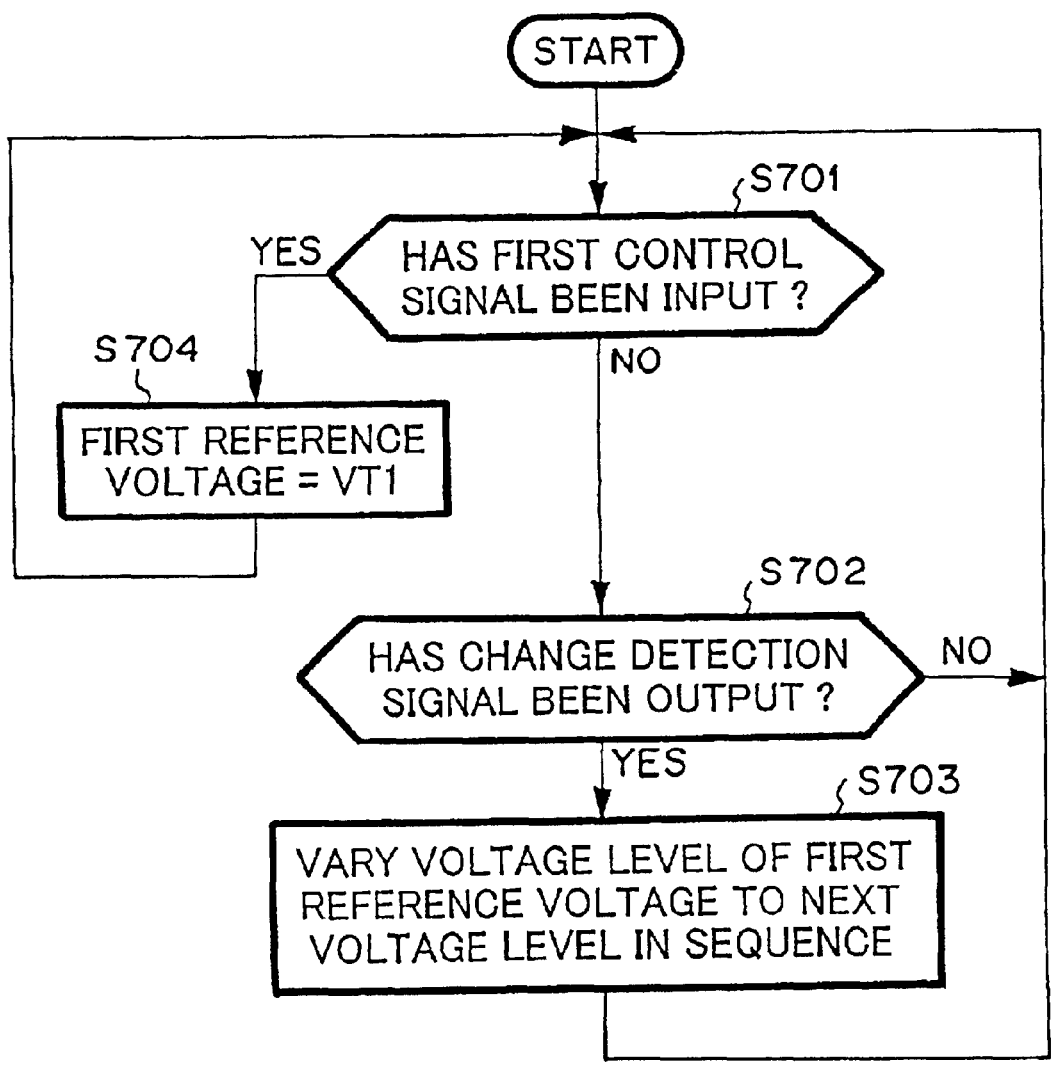
FIG. 18 is a flow chart showing the operation of the first reference voltage generating circuit according to the ninth embodiment of the present invention.

Referring to FIG. 18, at step S701, it is determined whether or not first control signal 14 has been input. When the determined result at step S701 is Yes, the flow advances to step S704. At step S704, the voltage level of first reference voltage 16 is set to VT1. When the determined result at step S701 is No, the flow advances to step S702. At step S702, it is determined whether or not the change detection signal has been output from the circuit shown in FIG. 9 included in first reference voltage generating circuit 2. When the determined result at step S702 is Yes, the flow advances to step S703. At step S703, the voltage level of the first reference voltage is varied to the next voltage level in the sequence. When the determined result at step S702 is No, the flow returns to step S701.

[Tenth Embodiment]

Figure 19:
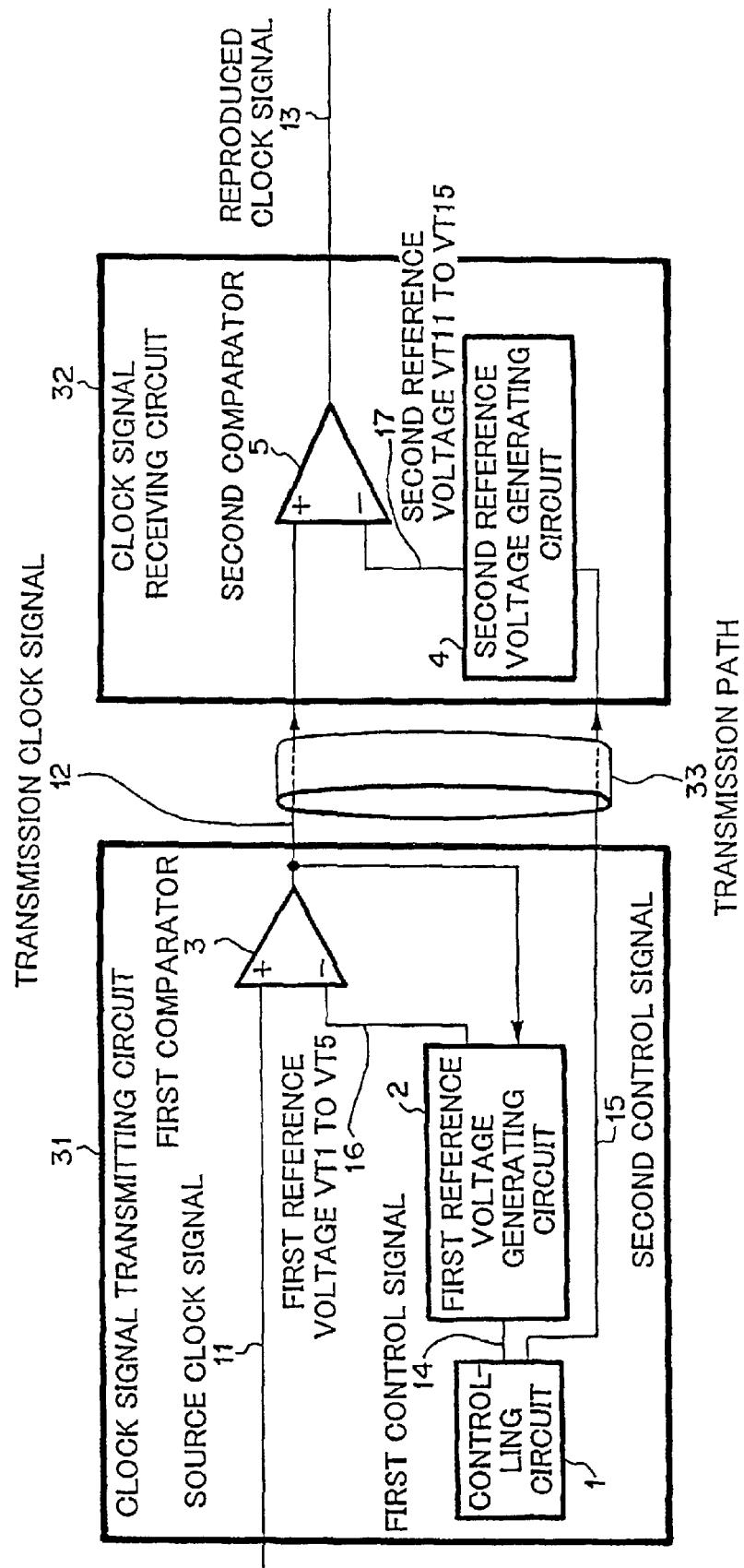
FIG. 19 is a block diagram showing the structure of a clock signal transmitting system according to a tenth embodiment of the present invention.

According to a tenth embodiment of the present invention shown in FIG. 19, controlling circuit 1 outputs first control signal 14 to first reference voltage generating circuit 2 every time when one or more periods of first reference voltage 16 and second reference voltage 17 elapse. First reference voltage generating circuit 2 inputs transmission clock signal 12 and first control signal 14 and causes a built-in flywheel circuit to use transmission clock signal 12 as a clock signal and first control signal 14 as a phase synchronization signal so as to generate first reference voltage 16.

Since the operation of first reference voltage generating circuit 2 according to the tenth embodiment is the same as that according to the ninth embodiment (see FIG. 18), the redundant description is omitted.

[Eleventh Embodiment]

Figure 20:
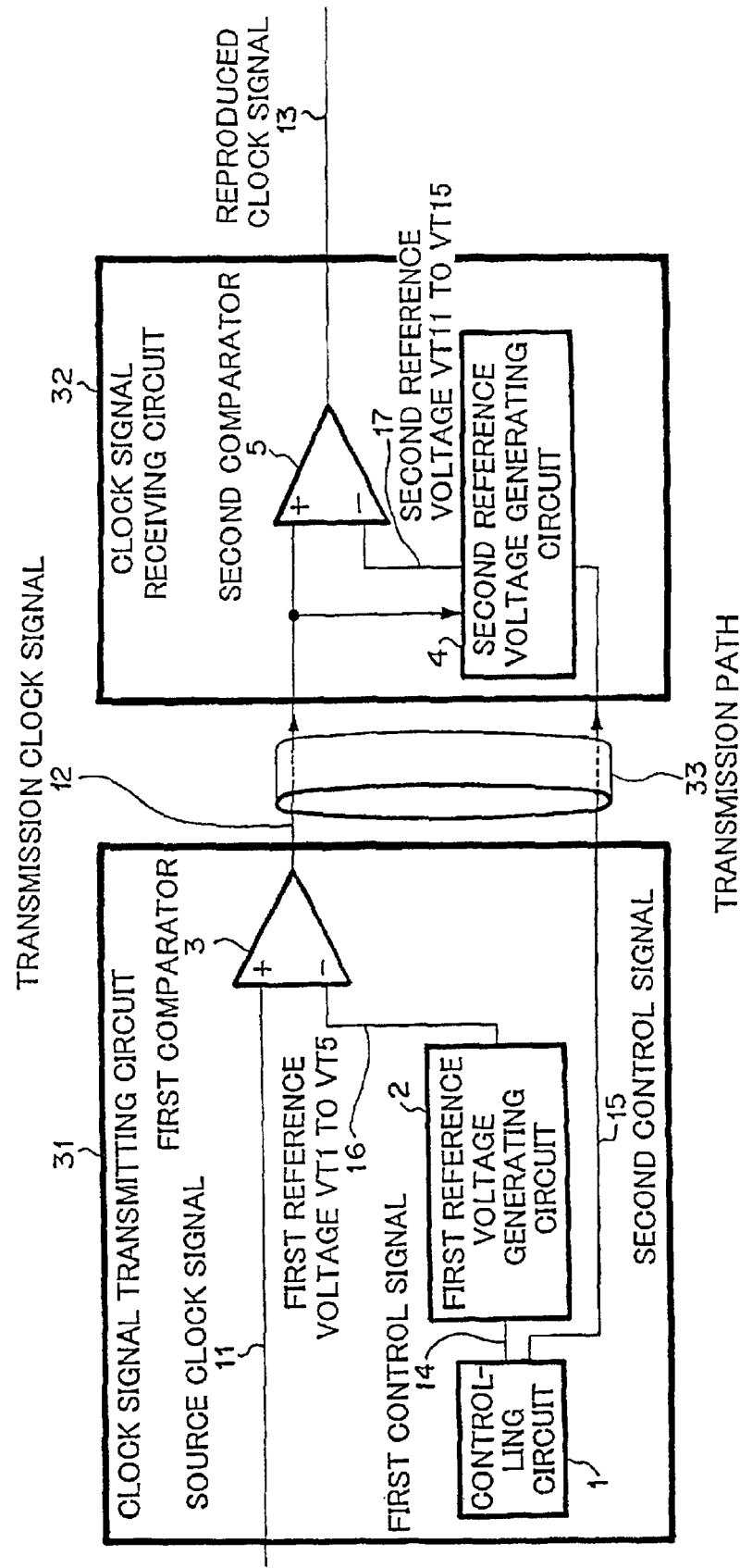
FIG. 20 is a block diagram showing the structure of a clock signal transmitting system according to an eleventh embodiment of the present invention.

According to an eleventh embodiment of the present invention shown in FIG. 20, controlling circuit 1 outputs second control signal 15 to second reference voltage generating circuit 4 every time when one or more periods of first reference voltage 16 and the second reference voltage 17 elapse. Second reference voltage generating circuit 4 inputs transmission clock signal 12 and second control signal 15 and causes a built-in flywheel circuit to use transmission clock signal 12 as a clock signal and second control signal 15 as a phase synchronization signal so as to generate second reference voltage 17.

Since the operation of second reference voltage generating circuit 4 according to the eleventh embodiment is the same as the operation of first reference voltage generating circuit 2 according to the ninth embodiment (see FIG. 18), the redundant description is omitted.

[Twelfth Embodiment]

Figure 21:
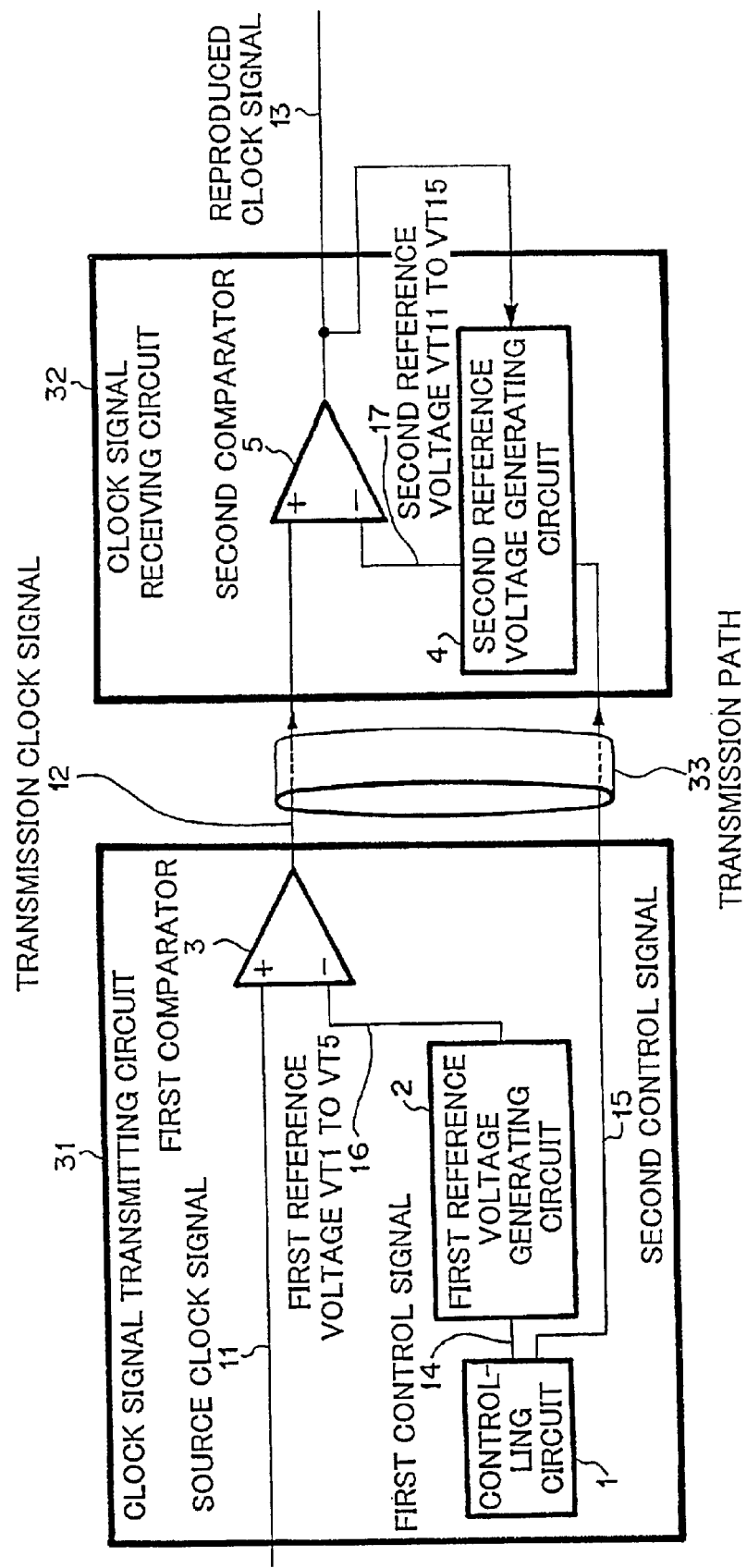
FIG. 21 is a block diagram showing the structure of a clock signal transmitting system according to a twelfth embodiment of the present invention.

According to a twelfth embodiment of the present invention shown in FIG. 21, controlling circuit 1 outputs second control signal 15 to second reference voltage generating circuit 4 every time when one or more periods of first reference voltage 16 and second reference voltage 17 elapse. Second reference voltage generating circuit 4 inputs reproduced clock signal 13 and second control signal 15 and causes a built-in flywheel circuit to use reproduced clock signal 13 as a clock signal and second control signal 15 as a phase synchronization signal so as to generate second reference voltage 17.

Since the operation of second reference voltage generating circuit 4 according to the twelfth embodiment is the same as the operation of first reference voltage generating circuit 2 according to the ninth embodiment (see FIG. 18), the redundant description is omitted.

[Thirteenth Embodiment]

According to a thirteenth embodiment of the present invention shown in FIG. 22, controlling circuit 1 outputs second control signal 15 to second reference voltage generating circuit 4 every time when one or more periods of first reference voltage 16 and second reference voltage 17 elapse. Local oscillator 8 outputs local clock signal 18 to second reference voltage generating circuit 4. Second reference voltage generating circuit 4 inputs local clock signal 18 and second control signal 15 and causes a built-in flywheel to use local clock signal 18 as a clock signal and second control signal 15 as a phase synchronization signal so as to generate second reference voltage 17.

Since the operation of second reference voltage generating circuit 4 according to the thirteenth embodiment is the same as the operation of first reference voltage generating circuit 2 according to the ninth embodiment (see FIG. 18), the redundant description is omitted.

[Fourteenth Embodiment]

Figure 23:
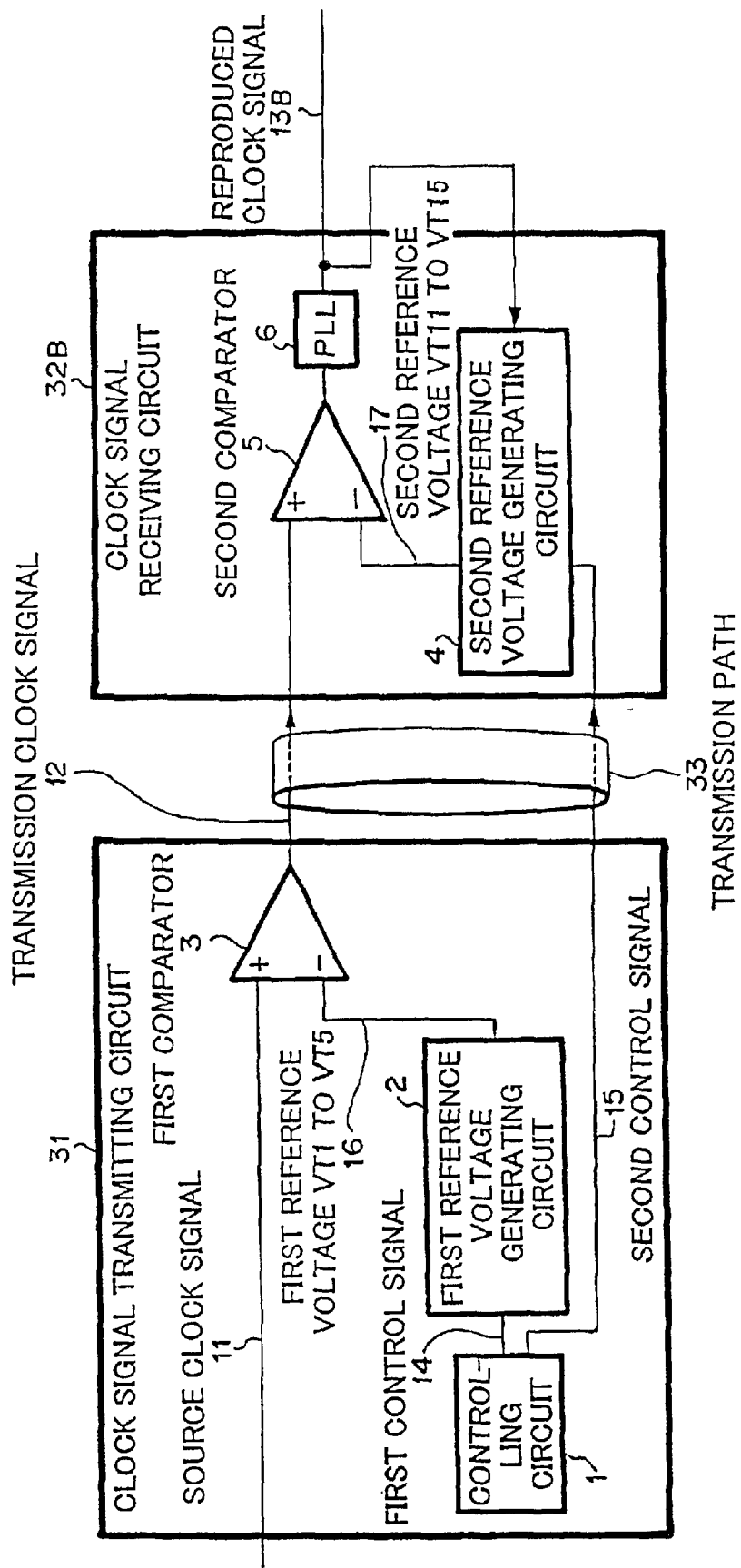
FIG. 23 is a block diagram showing the structure of a clock signal transmitting system according to a fourteenth embodiment of the present invention.

According to a fourteenth embodiment of the present invention shown in FIG. 23, controlling circuit 1 outputs second control signal 15 to second reference voltage generating circuit 4 every time when one or more periods of first reference voltage 16 and second reference voltage 17 elapse. Second reference voltage generating circuit 4 inputs reproduced clock signal 13B and second control signal 15 and causes a built-in flywheel circuit to use reproduced clock signal 13B as a clock signal and second control signal 15 as a phase synchronization signal so as to generate second reference voltage 17.

Since the operation of second reference voltage generating circuit 4 according to the fourteenth embodiment is the same as the operation of first reference voltage generating circuit 2 according to the ninth embodiment (see FIG. 18), the redundant description is omitted.

[Fifteenth Embodiment]

Since the second to fourth embodiments, the ninth and tenth embodiments, and the eleventh to fourteenth embodiments can be freely combined, 24 modifications (3×2×4=24) can be accomplished.

[Sixteenth Embodiment]

Figure 24:
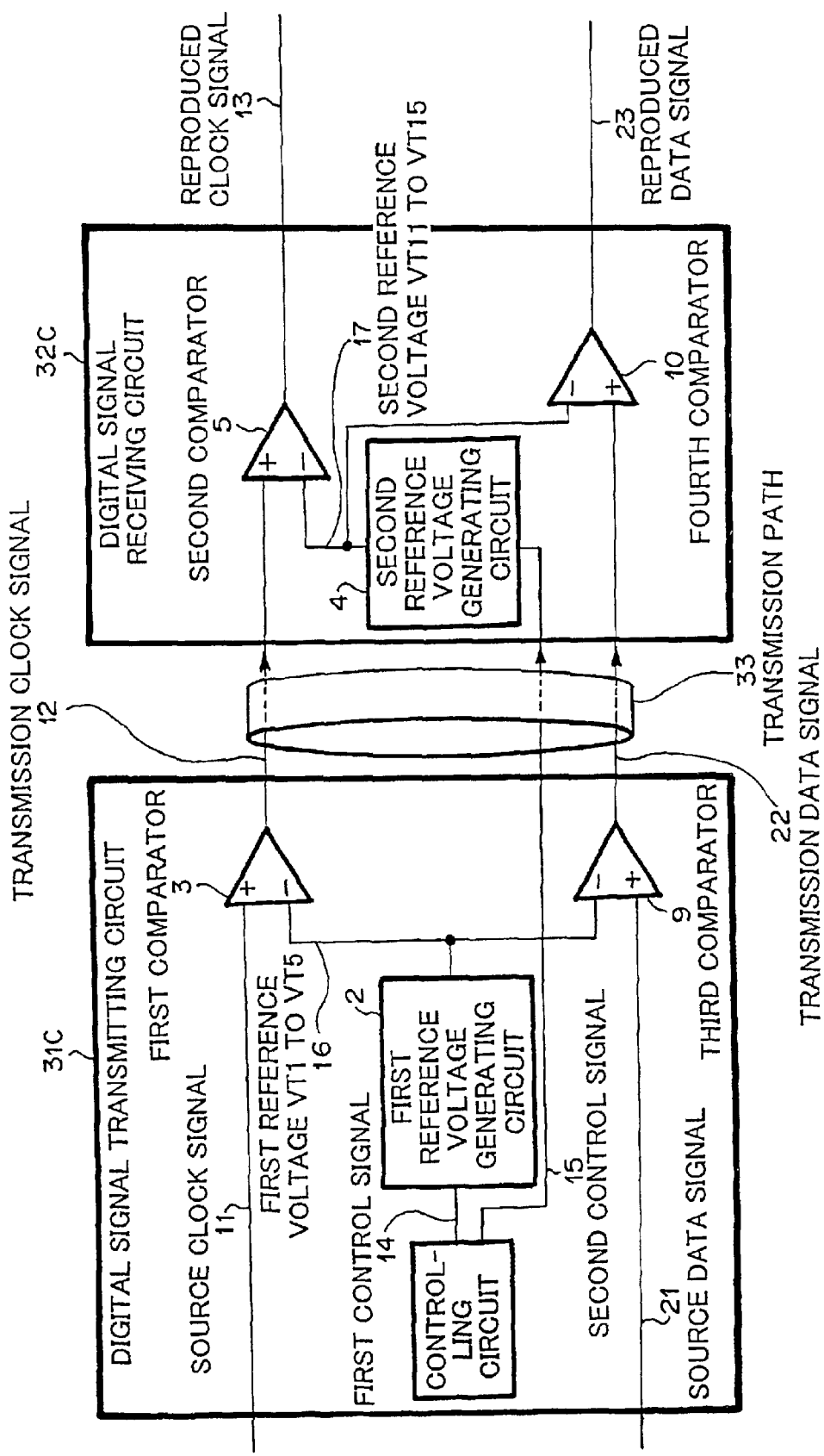
FIG. 24 is a block diagram showing the structure of a digital signal transmitting system according to a sixteenth embodiment of the present invention.

FIG. 24 shows the structure of a digital signal transmitting system according to a sixteenth embodiment of the present invention. Referring to FIG. 24, according to the sixteenth embodiment, third comparator 9 and fourth comparator 10 are added to the structure of the first embodiment shown in FIG. 1. Third comparator 9 and fourth comparator 10 are used to transmit a data signal. Third comparator 9 inputs first reference voltage 16 and source data signal 21, compares them, and outputs the compared result as transmission data signal 22. Fourth comparator 10 inputs second reference voltage 17 and transmission data signal 22, compares them, and outputs the compared result as reproduced data signal 23.

Figure 25:
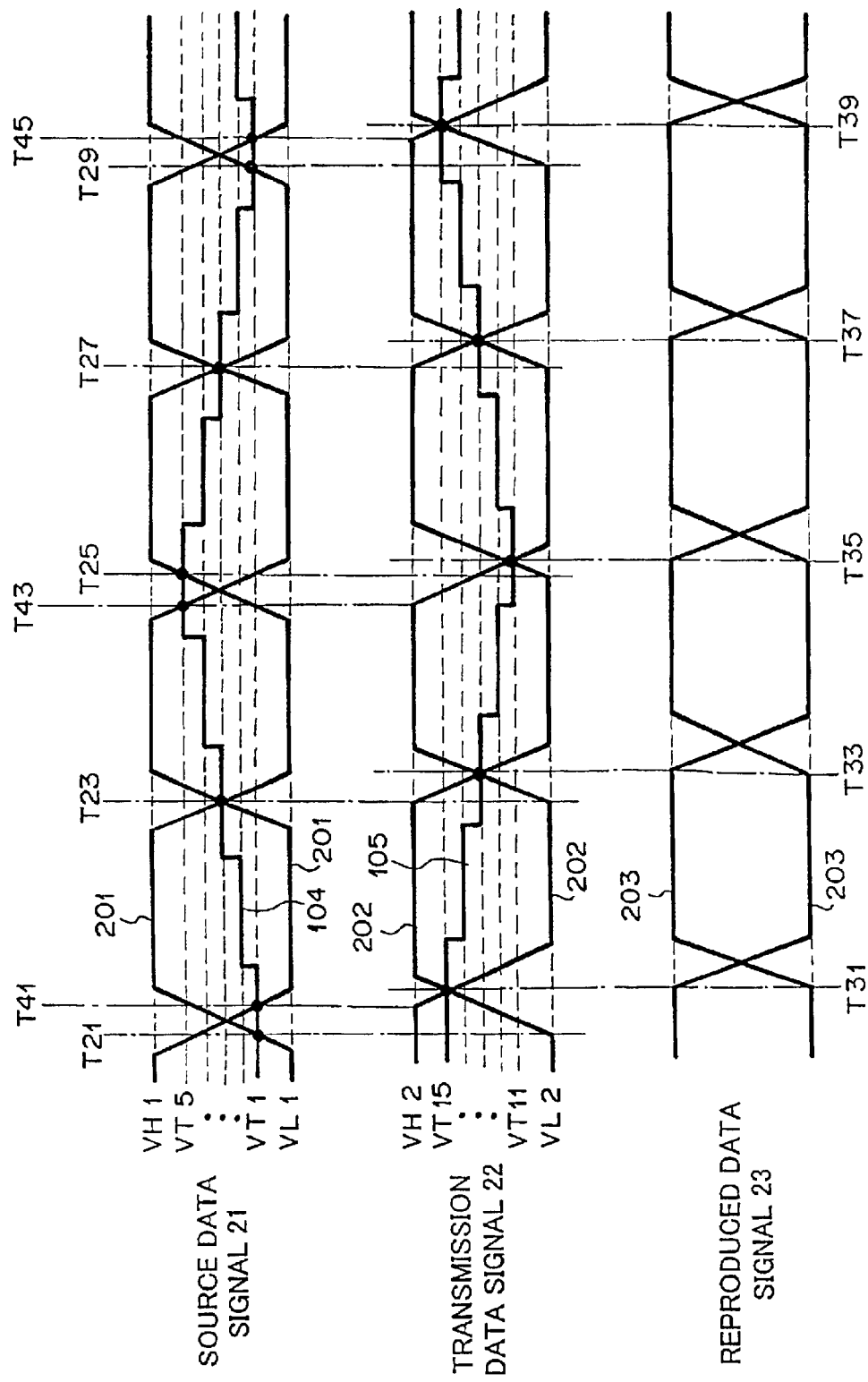
FIG. 25 is a timing diagram showing the timing of the digital signal transmitting system according to the sixteenth embodiment of the present invention.

FIG. 25 is a timing diagram showing waveform 201 of source data signal 21, waveform 202 of transmission data signal 22, waveform 203 of reproduced data signal 23, waveform 104 of first reference voltage 16, and waveform 105 of second reference voltage 17. Referring to FIG. 25, although the timing of the rising edge of transmission data signal 22 is not simultaneous with the timing of the falling edge of transmission data signal 22, the timing the of rising edge of the reproduced data signal 23 is simultaneous with the timing of the falling edge of reproduced data signal 23.

In other words, when the logical level of source data signal 21 becomes high, the waveform 202 of transmission data signal 22 begins to rise at times T21, T23, T25, T27, and T29. When the logical level of transmission data signal 22 becomes high, the waveform 203 of reproduced data signal 23 begins to rise at times T31, T33, T35, T37, and T39. On the other hand, when the logical level of source data signal 21 becomes low, waveform 202 of the logical level of transmission data signal 22 begins to fall at times T41, T23, T43, T27, and T45. When the logical level of transmission data signal 22 becomes low, the waveform 203 of reproduced data signal 23 begins to fall at times T31, T33, T35, T37, and T39.

Thus, although the phase of reproduced data signal 23 is delayed from the phase of source data signal 21, the waveform of reproduced data signal 23 becomes identical with the waveform of source data signal 21. In other words, jitters contained in the transmission data signal 22 is removed from reproduced data signal 23.

It should be noted that the second to fifteenth embodiments can be applied to the sixteenth embodiment as their modifications.

As was explained above, according to the present invention, since a source clock signal and a first reference voltage that periodically varies are input to a first comparator, the frequency of a transmission clock signal can be periodically varied corresponding to the timings at which the logical level of the clock signal becomes high and low. Thus, electromagnetic noise which takes place upon transmission of the transmission clock signal can be suppressed. This effect applies to a data signal.

Synchronization information of a control signal on a transmission side of a transmission clock signal is transmitted to a clock signal receiving circuit. Corresponding to the synchronous signal, a second reference voltage is periodically varied. Thus, a reproduced clock signal having a single frequency is obtained from a transmission clock signal whose frequency periodically varies. This effect applies to a data signal.

Although the present invention has been shown and explained with respect to the best modes of embodiment thereof, it should be understood by those skilled in the art that the foregoing and various other changes, omissions, and additions in the form and detail thereof may be made therein without departing from the spirit and scope of the present invention.

What is claimed is:

1. A clock signal transmitting system, comprising:
   a controlling circuit for generating a first control signal and a second control signal which contains synchronization information of said first control signal;
   a first reference voltage generating circuit for generating a first reference voltage which periodically varies corresponding to said first control signal;
   a second reference voltage generating circuit for generating a second reference voltage which periodically varies corresponding to said second control signal;
   a first comparator for comparing a source clock signal with said first reference voltage in order to generate a transmission clock signal; and
   a second comparator for comparing said transmission clock signal with said second reference voltage in order to generate a reproduced clock signal.

2. The clock signal transmitting system as set forth in claim 1,
   wherein the sum of said first reference voltage generated by said first reference voltage generating circuit and said second reference voltage generated by said second reference voltage generating circuit is a constant voltage.

3. The clock signal transmitting system as set forth in claim 1,
wherein said first reference voltage generated by said first reference voltage generating circuit and said second reference voltage generated by said second reference voltage generating circuit periodically vary in the same period.

4. The clock signal transmitting system as set forth in claim 1,
wherein said first reference voltage generating circuit switches said first reference voltage at a frequency twice as high as said source clock signal, and
wherein said second reference voltage generating circuit switches said second reference voltage at the frequency twice as high as said source clock signal.

5. The clock signal transmitting system as set forth in claim 1,
wherein said controlling circuit is disposed on a transmission side.

6. The clock signal transmitting system as set forth in claim 5,
wherein said controlling circuit generates said first control signal and said second control signal on the basis of said source clock signal.

7. The clock signal transmitting system as set forth in claim 5,
wherein said controlling circuit generates said first control signal and said second control signal on the basis of said transmission clock signal.

8. The clock signal transmitting system as set forth in claim 5,
wherein said controlling circuit generates said first control signal and said second control signal on the basis of said source clock signal and said transmission clock signal.

9. The clock signal transmitting system as set forth in claim 1,
wherein said controlling circuit generates said second control signal having a frequency which is lower than a frequency of said source clock signal.

10. The clock signal transmitting system as set forth in claim 1,
wherein said first reference voltage generating circuit generates said first reference voltage on the basis of said first control signal and said source clock signal.

11. The clock signal transmitting system as set forth in claim 1,
wherein said first reference voltage generating circuit generates said first reference voltage on the basis of said first control signal and said transmission clock signal.

12. The clock signal transmitting system as set forth in claim 1,
wherein said second reference voltage generating circuit generates said second reference voltage on the basis of said second control signal and said transmission clock signal.

13. The clock signal transmitting system as set forth in claim 1,
wherein said second reference voltage generating circuit generates said second reference voltage on the basis of said second control signal and said reproduced clock signal.

14. The clock signal transmitting system as set forth in claim 1, further comprising:
a local oscillator disposed on a reception side for generating a local clock signal,
wherein said second reference voltage generating circuit generates said second reference voltage on the basis of said second control signal and said local clock signal.

15. The clock signal transmitting system as set forth in claim 1, further comprising:
a PLL circuit which inputs said reproduced clock signal as a reference signal in order to output a refined reproduced clock signal.

16. The clock signal transmitting system as set forth in claim 1, further comprising:
a PLL circuit which inputs said reproduced clock signal as a reference signal in order to output a refined reproduced signal, wherein said second reference voltage generating circuit generates said second reference voltage on the basis of said second control signal and said refined reproduced signal.

17. The clock signal transmitting system as set forth in claim 1, further comprising:
a phase compensating circuit for compensating the phase of said reproduced clock signal.

18. The clock signal transmitting system as set forth in claim 1,
wherein said first control signal is the same as said second control signal.

19. A digital signal transmitting system, comprising:
the clock transmitting system as set forth in claim 1;
a third comparator for comparing a source data signal with said first reference voltage in order to generate a transmission data signal; and
a fourth comparator for comparing said transmission data signal with said second reference voltage in order to generate a reproduced data signal.

20. A clock signal transmitting method, comprising the steps of:
(a) generating a first control signal and a second control signal which contains synchronization information of said first control signal;
(b) generating a first reference voltage which periodically varies corresponding to said first control signal;
(c) generating a second reference voltage which periodically varies corresponding to said second control signal;
(d) comparing a source clock signal with said first reference voltage in order to generate a transmission clock signal; and
(e) comparing said transmission clock signal with said second reference voltage in order to generate a reproduced clock signal.

21. The clock signal transmitting method as set forth in claim 20,
wherein the sum of said first reference voltage generated at the first reference voltage generating step (b) and said second reference voltage generated at the second reference voltage generating step (c) is a constant voltage.

22. The clock signal transmitting method as set forth in claim 20,
wherein said first reference voltage generated at the first reference voltage generating step (b) and said second reference voltage generated at the second reference voltage generating step (c) periodically vary in the same period.

23. The clock signal transmitting method as set forth in claim 20, wherein the first reference voltage generating step (b) is performed by switching said first reference voltage at a frequency twice as high as said source clock signal, and wherein the second reference voltage generating step (c) is performed by switching said second reference voltage at the frequency twice as high as said source clock signal.

24. The clock signal transmitting method as set forth in claim 20, wherein the first and second control signals generating step (a) is performed on a transmission side.

25. The clock signal transmitting method as set forth in claim 24, wherein the first and second control signals generating step (a) is performed by generating said first control signal and said second control signal on the basis of said source clock signal.

26. The clock signal transmitting method as set forth in claim 24, wherein the first and second control signals generating step (a) is performed by generating said first control signal and said second control signal on the basis of said transmission clock signal.

27. The clock signal transmitting method as set forth in claim 24, wherein the first and second control signals generating step (a) is performed by generating said first control signal and said second control signal on the basis of said source clock signal and said transmission clock signal.

28. The clock signal transmitting method as set forth in claim 20, wherein the first and second control signals generating step (a) is performed by generating said second control signal having a frequency which is lower than a frequency of said source clock signal.

29. The clock signal transmitting method as set forth in claim 20, wherein the first reference voltage generating step (b) is performed by generating said first reference voltage on the basis of said first control signal and said source clock signal.

30. The clock signal transmitting method as set forth in claim 20, wherein the first reference voltage generating step (b) is performed by generating said first reference voltage on the basis of said first control signal and said transmission clock signal.

31. The clock signal transmitting method as set forth in claim 20, wherein the second reference voltage generating step (c) is performed by generating said second reference voltage on the basis of said second control signal and said transmission clock signal.

32. The clock signal transmitting method as set forth in claim 20, wherein the second reference voltage generating step (c) is performed by generating said second reference voltage on the basis of said second control signal and said reproduced clock signal.

33. The clock signal transmitting method as set forth in claim 20, further comprising the step of (f) generating a local clock signal on a reception side, wherein the second reference voltage generating step (c) is performed by generating said second reference voltage on the basis of said second control signal and said local clock signal.

34. The clock signal transmitting method as set forth in claim 20, further comprising the step of:

(g) supplying said reproduced clock signal as a reference signal to a PLL circuit in order to obtain a refined reproduced clock signal from said PLL circuit.

35. The clock signal transmitting method as set forth in claim 20, further comprising the step of:

(h) supplying said reproduced clock signal as a reference signal to a PLL circuit in order to obtain a refined reproduced clock signal from said PLL circuit, wherein said second reference voltage generating step (c) is performed by generating said second reference voltage on the basis of said second control signal and said refined reproduced clock signal.

36. The clock signal transmitting method as set forth in claim 20, further comprising the step of:

(i) compensating the phase of said reproduced clock signal.

37. The clock signal transmitting method as set forth in claim 20, wherein said first control signal is the same as said second control signal.

38. A digital signal transmitting method, comprising the steps of:

the clock transmitting method as set forth in claim 20;

(j) comparing a source data signal with said first reference voltage in order to generate a transmission data signal; and (k) comparing said transmission data signal with said second reference voltage in order to generate a reproduced data signal.

* * * * *